United States Patent
Huennekes et al.

(10) Patent No.: US 12,012,885 B2
(45) Date of Patent: Jun. 18, 2024

(54) SCR CATALYST FOR THE TREATMENT OF AN EXHAUST GAS OF A DIESEL ENGINE

(71) Applicant: BASF Corporation, Florham Park, NJ (US)

(72) Inventors: Edgar Viktor Huennekes, Hannover (DE); Kevin David Beard, Hannover (DE); Petra Cordes, Hannover (DE); Ruediger Wolff, Nienburg/Weser (DE); Jan Martin Becker, Hannover (DE)

(73) Assignee: BASF Corporation, Florham Park, NJ (US)

( * ) Notice: Subject to any disclaimer, the term of this patent is extended or adjusted under 35 U.S.C. 154(b) by 561 days.

(21) Appl. No.: 17/257,953

(22) PCT Filed: Jul. 24, 2019

(86) PCT No.: PCT/EP2019/069878
§ 371 (c)(1),
(2) Date: Jan. 5, 2021

(87) PCT Pub. No.: WO2020/020927
PCT Pub. Date: Jan. 30, 2020

(65) Prior Publication Data
US 2021/0180500 A1    Jun. 17, 2021

(30) Foreign Application Priority Data
Jul. 24, 2018  (EP) .................................... 18185261

(51) Int. Cl.
*F01N 3/20* (2006.01)
*B01J 21/06* (2006.01)
(Continued)

(52) U.S. Cl.
CPC .......... *F01N 3/2066* (2013.01); *B01J 21/063* (2013.01); *B01J 23/22* (2013.01); *B01J 37/0244* (2013.01);
(Continued)

(58) Field of Classification Search
CPC .. F01N 3/2066; F01N 2510/068; F01N 3/035; F01N 3/103; B01J 21/063;
(Continued)

(56) References Cited

U.S. PATENT DOCUMENTS 5,047,378 A   9/1991  Kato et al.
8,293,199 B2  10/2012  Beutel et al.
(Continued)

FOREIGN PATENT DOCUMENTS

CN    105944755 A    9/2016
CN    105188924 A    10/2017
(Continued)

OTHER PUBLICATIONS

Bourikas et al (Titanium Dioxide (Anatase and Rutile): Surface Chemistry, Liquid-Solid Interface Chemistry, and Scientific Synthesis of Supported Catalysts, Chemical Reviews, 2014) (Year: 2014).*

(Continued)

*Primary Examiner* — Colin W. Slifka
*Assistant Examiner* — Logan Edward Laclair
(74) *Attorney, Agent, or Firm* — DLA Piper LLP (US)

(57) ABSTRACT

An SCR catalyst for treating diesel exhaust gas has: a flow-through substrate with an inlet end, an outlet end, a substrate axial length extending from the inlet end to the outlet end and a plurality of passages defined by internal walls of the flow through substrate extending therethrough; a first coating disposed on the internal wall surface of the substrate, the surface defining the interface between the (Continued)

internal walls and passages, the first coating extending over 40 to 100% of the substrate axial length, the first coating having an 8-membered ring pore zeolitic material with copper and/or iron; a second coating extending over 20 to 100% of the substrate axial length, the second coating having a first oxidic material with titania, wherein at least 75 wt. % of the second coating is titania, calculated as $TiO_2$, and 0 to 0.01 wt. % of the second coating is vanadium oxides, calculated as $V_2O_5$.

14 Claims, 3 Drawing Sheets

(51) Int. Cl.
    *B01J 23/22*          (2006.01)
    *B01J 37/02*          (2006.01)

(52) U.S. Cl.
    CPC ..... *B01J 37/0246* (2013.01); *F01N 2510/068* (2013.01)

(58) Field of Classification Search
    CPC .... B01J 23/22; B01J 37/0244; B01J 37/0246; B01J 23/42; B01J 23/44; B01J 23/464; B01J 29/763; B01J 35/0006; B01J 35/04; B01J 29/14; B01J 29/46; B01J 29/68; B01J 29/7615; B01J 29/83; Y02T 10/12; B01D 53/9477; B01D 2255/20707; B01D 2255/20723; B01D 2255/20738; B01D 2255/20761; B01D 2255/20776; B01D 2255/50; B01D 2255/9022; B01D 2255/9205; B01D 2255/9207; B01D 2258/012; B01D 53/9418
    See application file for complete search history.

(56) References Cited

U.S. PATENT DOCUMENTS

| | | |
|---|---|---|
| 10,443,472 B2 | 10/2019 | Chandler et al. |
| 2011/0146237 A1 | 6/2011 | Adelmann et al. |
| 2014/0112853 A1 | 4/2014 | Mohanan et al. |
| 2014/0271422 A1* | 9/2014 | Tang ........................ B01J 23/10 60/299 |
| 2014/0271429 A1 | 9/2014 | Kazi et al. |
| 2014/0274665 A1 | 9/2014 | Vaarkamp et al. |

FOREIGN PATENT DOCUMENTS

| | | |
|---|---|---|
| JP | 2011-518658 A | 6/2011 |
| JP | 2016-500562 A | 1/2016 |
| JP | 2016-513584 A | 5/2016 |
| JP | 2017-060945 A | 3/2017 |
| WO | WO 2014/160293 A1 | 10/2014 |

OTHER PUBLICATIONS

International Search Report dated Aug. 29, 2019 in PCT/EP2019/069878 filed on Jul. 24, 2019.
Notice of Reasons for Refusal dated May 16, 2023, of counterpart Japanese Patent Application No. 2021-504248, along with an English translation.

* cited by examiner

SCR CATALYST FOR THE TREATMENT OF AN EXHAUST GAS OF A DIESEL ENGINE

The present invention relates to a selective catalytic reduction catalyst for the treatment of an exhaust gas of a diesel engine comprising a first coating comprising a zeolitic material comprising one or more of Cu and Fe and a second coating comprising titania. The present invention further relates to exhaust gas treatment systems comprising said selective catalytic reduction catalyst, to a process for preparing the selective catalytic reduction catalyst. Further, the present invention relates to uses of the selective catalytic reduction catalyst and of said systems and to methods using the selective catalytic reduction catalyst and said systems.

Yisun Cheng et al., Sulfur tolerance and $DeSO_x$ studies on diesel SCR catalysts, SAE International Journal Fuels and Lubricants 1(1), pages 471-476, 2008, disclose the impact of sulfur poisoning on catalysts comprising base metal containing zeolitic material, in particular Fe-zeolite and Cu-containing zeolite. It is demonstrated that the impact of sulfur was more significant on copper containing zeolite than iron containing zeolite, in particular at temperatures below 300° C.

Krishna Kamasamudram et al., $N_2O$ formation and mitigation in diesel after-treatment systems, Cummins Inc., SAE International Journal Engines 5(2), pages 688-698, 2012, study the nitrous oxide ($N_2O$) formation during SCR reactions with catalysts and its possible control using different SCR catalysts, such as copper containing catalyst and vanadium-based catalyst.

Ashok Kumar et al., Effect of transition metal ion properties on the catalytic functions and sulfation behavior of zeolite-based SCR catalysts, SAE International Journal Engines 10(4), pages 1604-1612, 2017, discloses copper containing BEA zeolitic material, iron containing BEA zeolitic material and H-form BEA zeolitic material. These materials are tested and it results that copper containing BEA zeolitic material shows the higher $N_2O$ formation under standard and fast SCR reaction. Accordingly, it demonstrates that copper-containing zeolites alone are not able to provide low nitrous oxide ($N_2O$) emissions.

U.S. Pat. No. 5,047,378B describes a catalyst intended for the stationary power generation market. In addition to $NH_3$-SCR there is an emphasis on CO oxidation as well. Said document discloses a mixture of titania supporting Cu or Co particles and Cu-zeolite. CN105944755 A describes a process to precipitate $TiO_2$ with Cu-SAPO in order to provide protection against sulfation. However, these documents do not teach how to lower nitrous oxides emissions and/or a longer term sulfation in a SCR catalyst for the treatment of an exhaust gas of a diesel engine.

Therefore, it was an object of the present invention to provide a selective catalytic reduction catalyst which achieve great deNOx, even at low temperatures, while exhibiting low $N_2O$ formation and being more sulfur resistant. Surprisingly, it was found that the selective catalytic reduction catalyst according to the present invention permits to achieve great deNOx, even at low temperatures, while exhibiting low $N_2O$ formation and being more sulfur resistant.

Therefore, the present invention relates to a selective catalytic reduction catalyst for the treatment of an exhaust gas of a diesel engine comprising:
- (i) a flow through substrate comprising an inlet end, an outlet end, a substrate axial length extending from the inlet end to the outlet end and a plurality of passages defined by internal walls of the flow through substrate extending therethrough;
- (ii) a first coating disposed on the surface of the internal walls of the substrate, which surface defines the interface between the internal walls and the passages, wherein the first coating extends over 40 to 100% of the substrate axial length, wherein the first coating comprises a zeolitic material comprising one or more of copper and iron, wherein the zeolitic material has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MW, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, preferably CHA, AEI, BEA, MFI, FAU, FER, RTH, LEV, DDR, KFI, ERI, AFX, a mixture of two or more thereof, and a mixed type of two or more thereof;
- (iii) a second coating extending over 20 to 100% of the substrate axial length, wherein the second coating comprises a first oxidic material comprising titania, wherein at least 75 weight-% of the second coating consist of titania and wherein from 0 to 0.01 weight-% of the second coating consists of one or more vanadium oxides calculated as $V_2O_5$.

It is preferred that the zeolitic material comprised in the first coating has a framework type selected from the group consisting of CHA, AEI, BEA, MFI, FER, a mixture of two or more thereof, and a mixed type of two or more thereof. It is more preferred that the zeolitic material comprised in the first coating has a framework type CHA. Alternatively, it is more preferred that the zeolitic material comprised in the first coating has a framework type BEA.

Therefore, the present invention further relates to a selective catalytic reduction catalyst for the treatment of an exhaust gas of a diesel engine comprising:
- (i) a flow through substrate comprising an inlet end, an outlet end, a substrate axial length extending from the inlet end to the outlet end and a plurality of passages defined by internal walls of the flow through substrate extending therethrough;
- (ii) a first coating disposed on the surface of the internal walls of the substrate, which surface defines the interface between the internal walls and the passages, wherein the first coating extends over 40 to 100% of the substrate axial length, wherein the first coating comprises an 8-membered ring pore zeolitic material comprising one or more of copper and iron, (iii) a second coating extending over 20 to 100% of the substrate axial length, wherein the second coating comprises a first oxidic material comprising titania, wherein at least 75 weight-% of the second coating consist of titania, calculated as $TiO_2$, and wherein from 0 to 0.01 weight-% of the second coating consists of one or more vanadium oxides, calculated as $V_2O_5$.

Preferably, the first coating according to (ii) extends from the inlet end toward the outlet inlet. Alternatively, it is preferred that the first coating extends from the outlet end toward the inlet end.

It is preferred that the first coating according to (ii) extends over 50 to 100%, more preferably over 75 to 100%, more preferably over 95 to 100%, more preferably over 98 to 100%, more preferably over 99 to 100% of the substrate axial length. It is more preferred that the first coating according to (ii) extends over 99 to 100% of the substrate axial length from the inlet end toward the outlet end of the substrate.

It is preferred that the second coating according to (iii) extends from the inlet end toward the outlet end of the substrate.

According to the present invention, it is preferred that the second coating according to (iii) extends over 50 to 100%, more preferably over 75 to 100%, more preferably over 95 to 100%, more preferably over 98 to 100%, more preferably over 99 to 100%, of the substrate axial length.

It is more preferred that the first coating according to (ii) extends over 99 to 100% of the substrate axial length and that the second coating according to (iii) extends over 99 to 100% of the substrate axial length.

It is more preferred that the first coating according to (ii) extends over 75 to 100% of the substrate axial length, more preferably from the inlet end toward the outlet end of the substrate or more preferably from the outlet end toward the inlet end. It is more preferred that the second coating according to (iii) extends over 75 to 100% of the substrate axial length, more preferably from the inlet end toward the outlet end of the substrate.

Therefore, the present invention preferably relates to a selective catalytic reduction catalyst for the treatment of an exhaust gas of a diesel engine comprising:

(i) a flow through substrate comprising an inlet end, an outlet end, a substrate axial length extending from the inlet end to the outlet end and a plurality of passages defined by internal walls of the flow through substrate extending therethrough;

(ii) a first coating disposed on the surface of the internal walls of the substrate, which surface defines the interface between the internal walls and the passages, wherein the first coating extends over 99 to 100% of the substrate axial length, wherein the first coating comprises an 8-membered ring pore zeolitic material comprising one or more of copper and iron, (iii) a second coating extending over 99 to 100% of the substrate axial length, wherein the second coating comprises a first oxidic material comprising titania, wherein at least 75 weight-% of the second coating consist of titania, calculated as $TiO_2$, and wherein from 0 to 0.01 weight-% of the second coating consists of one or more vanadium oxides, calculated as $V_2O_5$.

According to the present invention, it may also be preferred that the first coating according to (ii) extends over 98 to 100%, more preferably over 99 to 100%, of the substrate axial length and that the second coating according to (iii) extends over 20 to 90%, more preferably 30 to 80%, more preferably 40 to 60%, more preferably over 45 to 55%, more preferably over 48 to 52% of the substrate axial length from the inlet end toward the outlet end of the substrate.

It is preferred that the second coating according to (iii) is disposed on the first coating according to (ii).

According to the present invention, it may also be preferred that the first coating according to (ii) extends over 40 to 50%, more preferably 45 to 50%, more preferably 48 to 50% of the substrate axial length from the outlet end toward the inlet end of the substrate, and that the second coating according to (iii) extends over 40 to 50%, more preferably 45 to 50%, more preferably 48 to 50% of the substrate axial length from the inlet end toward the outlet end of the substrate.

In the context of the present invention, it is preferred that the 8-membered ring pore zeolitic material contained in the first coating has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, a mixture of two or more thereof and a mixed type of two or more thereof, more preferably selected from the group consisting of CHA and AEI. It is more preferred that the 8-membered ring pore zeolitic material contained in the first coating has a framework type CHA. It is more preferred that the 8-membered ring pore zeolitic material is a zeolite SSZ-13.

In the context of the present invention, it is preferred that the zeolitic material comprised in the first coating, more preferably which has a framework type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

It is preferred that the zeolitic material contained in the first coating comprises copper, wherein the amount of copper in the zeolitic material, calculated as CuO, is more preferably in the range of from 0.1 to 10 weight-%, more preferably in the range of from 1.5 to 5.5 weight-%, more preferably in the range of from 2.5 to 4.5 weight-%, more preferably in the range of from 3.0 to 4.0 weight-%, more preferably in the range of from 3.0 to 3.5 weight-%, based on the total weight of the zeolitic material. It is more preferred that the amount of iron comprised in the zeolitic material, calculated as $Fe_2O_3$, is in the range of from 0 to 0.01 weight-%, more preferably in the range of from 0 to 0.001 weight-%, more preferably in the range of from 0 to 0.0001 weight-% based on the total weight of the zeolitic material.

Preferably from 95 to 100 weight-%, more preferably from 98 to 100 weight-%, more preferably from 99 to 100 weight-% of the framework structure of the zeolitic material comprised in the first coating consist of Si, Al, O, and optionally H.

It is preferred that in the framework structure of the zeolitic material contained in the first coating, the molar ratio of Si to Al, calculated as molar $SiO_2:Al_2O_3$, is preferably in the range of from 2:1 to 50:1, more preferably in the range of from 2:1 to 45:1. It is more preferred that in the framework structure of the zeolitic material contained in the first coating, the molar ratio of Si to Al, calculated as molar $SiO_2:Al_2O_3$, is in the range of from 10:1 to 40:1, more preferably in the range of from 20:1 to 35:1, more preferably in the range of from 25:1 to 35:1. Alternatively, it is more preferred that in the framework structure of the zeolitic material, the molar ratio of Si to Al, calculated as molar $SiO_2:Al_2O_3$, is in the range of from 2:1 to 15:1, more preferably in the range of from 2:1 to 12:1, more preferably in the range of from 3:1 to 8:1.

Therefore, the present invention preferably relates to a selective catalytic reduction catalyst for the treatment of an exhaust gas of a diesel engine comprising:
  (i) a flow through substrate comprising an inlet end, an outlet end, a substrate axial length extending from the inlet end to the outlet end and a plurality of passages defined by internal walls of the flow through substrate extending therethrough;
  (ii) a first coating disposed on the surface of the internal walls of the substrate, which surface defines the interface between the internal walls and the passages, wherein the first coating extends over 40 to 100% of the substrate axial length, wherein the first coating comprises a zeolitic material having a framework type CHA comprising copper, wherein in the framework structure of the zeolitic material contained in the first coating, the molar ratio of Si to Al, calculated as molar $SiO_2:Al_2O_3$, is in the range of from 10:1 to 40:1, more preferably in the range of from 20:1 to 35:1, more preferably in the range of from 25:1 to 35:1;
  (iii) a second coating extending over 20 to 100% of the substrate axial length, wherein the second coating comprises a first oxidic material comprising titania, wherein at least 75 weight-% of the second coating consist of titania, calculated as $TiO_2$, and wherein from 0 to 0.01 weight-% of the second coating consists of one or more vanadium oxides, calculated as $V_2O_5$,
wherein the first coating according to (ii) extends more preferably over 98 to 100% of the substrate axial length and the second coating according to (iii) extends more preferably over 98 to 100% of the substrate axial length.

It is preferred that the zeolitic material contained in the first coating comprises iron, wherein the amount of iron comprised in the zeolitic material, calculated as $Fe_2O_3$, is more preferably in the range of from 0.1 to 10.0 weight-%, more preferably in the range of from 0.5 to 7.0 weight-%, more preferably in the range of from 1.0 to 5.5 weight-%, more preferably in the range of from 2.0 to 5.5 weight-%, based on the total weight of the zeolitic material. More preferably from 95 to 100 weight-%, more preferably from 98 to 100 weight-%, more preferably from 99 to 100 weight-% of the framework structure of the zeolitic material consist of Si, Al, O, and optionally H, wherein in the framework structure, the molar ratio of Si to Al, calculated as molar $SiO_2:Al_2O_3$, is more preferably in the range of from 2:1 to 50:1, more preferably in the range of from 2:1 to 45:1. It is more preferred that in the framework structure of the zeolitic material, the molar ratio of Si to Al, calculated as molar $SiO_2:Al_2O_3$, is in the range of from 10:1 to 40:1, more preferably in the range of from 20:1 to 35:1, more preferably in the range of from 25:1 to 35:1. It is alternatively more preferred that in the framework structure of the zeolitic material, the molar ratio of Si to Al, calculated as molar $SiO_2:Al_2O_3$, is in the range of from 2:1 to 15:1, more preferably in the range of from 2:1 to 12:1, more preferably in the range of from 3:1 to 8:1.

According to the present invention, it is preferred that, in the catalyst, the first coating comprises the zeolitic material at a loading in the range of from 0.5 to 5 $g/in^3$, more preferably in the range of from 1 to 4 $g/in^3$, more preferably in the range of from 1.5 to 2.5 $g/in^3$.

As to the first coating according to (ii), it is preferred that it further comprises an oxidic binder, wherein the oxidic binder more preferably comprises one or more of zirconia, alumina, titania, silica, and a mixed oxide comprising two or more of Zr, Al, Ti, and Si, more preferably comprises one or more of silica, alumina and zirconia, more preferably comprises one or more of alumina and zirconia, more preferably zirconia. It is more preferred that in the catalyst, the first coating comprises the oxidic binder at a loading in the range of 0.05 to 0.15 $g/in^3$, more preferably in the range of from 0.08 to 0.14 $g/in^3$.

It is preferred that the first coating comprises the zeolitic material at a loading (Iz) and the oxidic binder at a loading (Ib), wherein the ratio of the loading of the oxidic binder (Ib) to the loading of the zeolitic material (Iz), (Ib):(Iz), is in the range of from 0.02:1 to 0.1:1, more preferably in the range of from 0.03:1 to 0.8:1, more preferably in the range of from 0.03:1 to 0.07:1.

Preferably from 95 to 100 weight-%, more preferably from 98 to 100 weight-%, more preferably from 99 to 100 weight-%, more preferably from 99.5 to 100 weight-% of the first coating consist of a 8-membered ring pore zeolitic material comprising one or more of copper and iron, and preferably the oxidic binder as defined in the foregoing.

Preferably from 0 to 0.01 weight-%, more preferably from 0 to 0.001 weight-%, more preferably from 0 to 0.0001 weight-% of the first coating consist of titania. It is more preferred that the first coating is free of titania.

Preferably from 0 to 0.001 weight-%, more preferably from 0 to 0.0001 weight-%, more preferably from 0.00001 weight-% of the framework structure of the zeolitic material comprised in the first coating consist of P.

As to the second coating according to (iii), it is preferred that the titania comprised in the first oxidic material of the second coating has one or more of a tetragonal crystal system and an orthorhombic crystal system, more preferably a tetragonal crystal system, more preferably one or more of the rutile and the anatase structure, more preferably the anatase structure.

Preferably from 85 to 100 weight-%, more preferably from 90 to 100 weight-%, more preferably from 95 to 100 weight-%, more preferably from 99 to 100 weight-% of the second coating consist of titania, wherein titania preferably has one or more of a tetragonal crystal system and an orthorhombic crystal system, more preferably a tetragonal crystal system, more preferably one or more of the rutile and the anatase structure, more preferably the anatase structure.

It is preferred that the first oxidic material of the second coating further comprises one or more of cerium oxide, magnesium oxide, niobium oxide, silicon oxide and tungsten oxide, more preferably one or more of cerium oxide and tungsten oxide. It is more preferred that the first oxidic material of the second coating further comprises tungsten oxide, more preferably the first oxidic material of the second coating comprises, more preferably consists of, tungsten oxide impregnated on the titania.

Preferably from 90 to 100 weight-%, more preferably from 95 to 100 weight-%, more preferably from 98 to 100 weight-%, more preferably from 99 to 100 weight-% of the first oxidic material of the second coating consist of titania, wherein titania more preferably has one or more of a tetragonal crystal system and an orthorhombic crystal system, more preferably a tetragonal crystal system, more preferably one or more of the rutile and the anatase structure, more preferably the anatase structure, and optionally one or more of cerium oxide, magnesium oxide, niobium oxide, silicon oxide and tungsten oxide, more preferably one or more of cerium oxide and tungsten oxide, more preferably tungsten oxide. More preferably from 99 to 100 weight-% of the first oxidic material of the second coating consist of from 80 to 95 weight-%, more preferably from 85 to 92 weight-%, of titania and from 5 to 20 weight-%, more preferably from 8 to 15 weight-%, of the one or more of cerium oxide, magnesium oxide, niobium oxide, silicon oxide and tungsten oxide, more preferably tungsten oxide.

It is preferred that, in the catalyst, the second coating comprises the first oxidic material at a loading in the range of from 15.26 to 305.1 g/l (0.25 to 5.0 g/in$^3$) more preferably in the range of from 30.51 to 244.1 g/l (0.5 to 4.0 g/in$^3$), more preferably in the range of from 45.8 to 213.6 g/l (0.75 to 3.5 g/in$^3$), more preferably in the range of from 48.8 to 183.1 g/l (0.8 to 3.0 g/in3), more preferably in the range of from 54.9 to 122.05 g/l (0.9 to 2.0 g/in$^3$).

It is preferred that the second coating further comprises a second oxidic material comprising one or more of silica, alumina, zirconia, and ceria, more preferably one or more of silica and alumina. It is more preferred that the second oxidic material comprises, more preferably consists of, alumina and silica, more preferably gamma-alumina and silica, wherein the alumina, more preferably the gamma-alumina, optionally contains silicon. It is alternatively more preferred that the second oxidic material comprises, more preferably consists of, silica.

It is preferred that, in the catalyst, the second coating comprises the second oxidic material at a loading in the range of from 0.61 to 36.6 g/l (0.01 to 0.6 g/in$^3$), more preferably in the range of from 1.22 to 24.4 g/l (0.02 to 0.4 g/in$^3$), more preferably in the range of from 3.05 to 21.36 g/l (0.05 to 0.35 g/in$^3$).

Preferably from 90 to 100 weight-%, more preferably from 95 to 100 weight-%, more preferably from 98 to 100 weight-%, more preferably from 99 to 100 weight-% of the second coating consist of the first oxidic material and the second oxidic material as defined in the foregoing.

Preferably from 0 to 0.1 weight-%, more preferably from 0 to 0.01 weight-%, more preferably from 0 to 0.001 weight-% of the second coating consist of a zeolitic material. It is more preferred that the second coating is free of a zeolitic material, wherein the zeolitic material more preferably comprises one or more of copper and iron.

Preferably from 0 to 0.001 weight-%, more preferably from 0 to 0.0001 weight-%, of the second coating consist of one or more vanadium oxides. It is more preferred that the second coating is free of vanadium oxides.

Preferably from 0 to 0.001 weight-%, more preferably from 0 to 0.0001 weight-% of the second coating consist of one or more of platinum and palladium, more preferably of one or more of platinum, palladium and rhodium, more preferably of one or more of noble metals.

According to the present invention, it is preferred that from 95 to 100 weight-%, more preferably from 98 to 100 weight-%, more preferably from 99 to 100 weight-% of the first coating consist of a zeolitic material having a framework type CHA and comprising copper, and more preferably the oxidic binder as defined in the foregoing; and that from 90 to 100 weight-%, more preferably from 95 to 100 weight-%, more preferably from 98 to 100 weight-%, more preferably from 99 to 100 weight-% of the second coating consist of the first oxidic material and the second oxidic material as defined in the foregoing; wherein from 95 to 100 weight-%, more preferably from 98 to 100 weight-%, more preferably from 99 to 100 weight-%, of the first oxidic material consist of titania, wherein titania more preferably has one or more of a tetragonal crystal system and an orthorhombic crystal system, more preferably a tetragonal crystal system, more preferably one ore more of the rutile and the anatase structure, more preferably the anatase structure, and the second oxidic material comprises, more preferably consists of, one or more of alumina and silica.

According to the present invention, it is alternatively more preferred that from 95 to 100 weight-%, more preferably from 98 to 100 weight-%, more preferably from 99 to 100 weight-% of the first coating consist of a zeolitic material having a framework type CHA and comprising copper, and more preferably the oxidic binder as defined in the foregoing; and that from 90 to 100 weight-%, more preferably from 95 to 100 weight-%, more preferably from 98 to 100 weight-%, more preferably from 99 to 100 weight-% of the second coating consist of the first oxidic material and the second oxidic material as defined in the foregoing; wherein from 95 to 100 weight-%, more preferably from 98 to 100 weight-%, more preferably from 99 to 100 weight-% of the first oxidic material consist of titania and tungsten oxide, wherein titania more preferably has one or more of a tetragonal crystal system and an orthorhombic crystal system, more preferably a tetragonal crystal system, more preferably one ore more of the rutile and the anatase structure, more preferably the anatase structure; wherein more preferably from 99 to 100 weight-% of the first oxidic material consist of from 80 to 95 weight-%, more preferably from 85 to 92 weight-%, of titania and from 5 to 20 weight-%, more preferably from 8 to 15 weight-%, of tungsten oxide, and the second oxidic material comprises, more preferably consists of, one or more of alumina and silica.

In the context of the present invention, it is preferred that, in the catalyst, the first coating has a total loading (l1) and the second coating has a total loading (l2), wherein the ratio of the total loading of the first coating relative to the total loading of the second coating, (l1):(l2), is in the range of from 0.5:1 to 5:1, more preferably in the range of from 0.75:1 to 3:1, more preferably in the range of from 1:1 to 2:1.

As to the flow through substrate, it is preferred that it comprises, more preferably consists of, a ceramic or metallic substance. More preferably the flow through substrate comprises, more preferably consists of, a ceramic substance, wherein the ceramic substance more preferably comprises, more preferably consists of, one or more of an alumina, a silica, a silicate, an aluminosilicate, more preferably a cordierite or a mullite, an aluminotitanate, a silicon carbide, a zirconia, a magnesia, more preferably a spinel, and a titania, more preferably one or more of a silicon carbide and a cordierite, more preferably a cordierite. Alternatively, more preferably the flow through substrate comprises, more preferably consists of, a metallic substance, wherein the metallic substance more preferably comprises, more preferably consists of, oxygen and one or more of iron, chromium, and aluminum.

As to the substrate, it is preferred that it has a substrate length in the range of from 2.54 to 25.4 cm (1 to 10 inches), more preferably in the range of from 5.08 to 20.32 cm (2 to 8 inches), more preferably in the range of from 10.16 to 19.05 cm (4 to 7.5 inches), more preferably in the range of from 12.7 to 17.78 cm (5 to 7 inches).

As to the substrate, it is preferred that it has a substrate width in the range of from 10.16 to 43.18 cm (4 to 17 inches), more preferably in the range of from 17.78 to 38.10 cm (7 to 15 inches), more preferably in the range of from 20.32 to 35.56 cm (8 to 14 inches), more preferably in the range of from 22.86 to 33.02 cm (9 to 13 inches), more preferably in the range of from 22.86 to 27.94 cm (9 to 11 inches).

In the context of the present invention, it is preferred that from 95 to 100 weight-%, more preferably from 98 to 100 weight-%, more preferably from 99 to 100 weight-%, more preferably from 99.5 to 100 weight-% of the selective catalytic reduction catalyst consist of the flow through substrate, the first coating and the second coating. It is more preferred that the selective catalytic reduction catalyst of the present invention consist of the flow through substrate, the first coating and the second coating.

The present invention further relates to an exhaust gas treatment system for treating an exhaust gas stream exiting a diesel engine, said exhaust gas treatment system having an upstream end for introducing said exhaust gas stream into said exhaust gas treatment system, wherein said exhaust gas treatment system comprises
- (A) a diesel oxidation catalyst (DOC), wherein the diesel oxidation catalyst comprises a coating disposed on a substrate, wherein the coating preferably comprises one or more of palladium, platinum and rhodium, more preferably palladium and platinum, more preferably platinum, supported on an oxidic material;
- (B) one or more selective catalytic reduction (SCR) catalysts according to the present invention;
wherein the diesel oxidation catalyst according to (A) is located upstream of the one or more selective catalytic reduction catalysts according to (B), wherein preferably the diesel oxidation catalyst according to (A) is the first catalyst of the exhaust gas treatment system and is located downstream of the upstream end of said exhaust gas treatment system;
wherein the exhaust gas treatment system optionally further comprises a filter, preferably a catalyzed soot filter, which is located downstream of the diesel oxidation catalyst according to (A) and upstream of the one or more selective catalytic reduction catalyst according to (B).

As to the diesel oxidation catalyst, it is preferred that the oxidic material comprised in the coating of the diesel oxidation catalyst comprises one or more of zirconia, alumina, titania and silica, more preferably one or more of zirconia and titania, more preferably titania.

It is preferred that the coating of the diesel oxidation catalyst further comprises one or more of alumina, silica and zirconia, more preferably one or more of alumina and zirconia, more preferably alumina and zirconia.

Preferably from 90 to 100 weight-%, more preferably from 95 to 100 weight-%, more preferably from 99 to 100 weight-% of the coating of the diesel oxidation catalyst consist of one or more of palladium, platinum and rhodium supported on an oxidic material, more preferably titania, and more preferably one or more of alumina, silica and zirconia, more preferably one or more of alumina and zirconia, more preferably alumina and zirconia.

It is preferred that the coating of the diesel oxidation catalyst comprises one or more of palladium, platinum and rhodium at a loading in said catalyst in the range of from 0.11 to 1.10 g/l (3 to 30 g/ft$^3$), more preferably in the range of from 0.18 to 0.71 g/l (5 to 20 g/ft$^3$), more preferably in the range of from 0.28 to 0.42 g/l (8 to 12 g/ft$^3$).

It is preferred that the coating of the diesel oxidation catalyst comprises the oxidic material, supporting the one or more of palladium, platinum and rhodium, at a loading in said catalyst in the range of from 30.51 g/l to 305.1 g/l (0.5 to 5 g/in$^3$), more preferably in the range of from 45.77 to 122.05 g/l (0.75 to 2 g/in$^3$), more preferably in the range of from 48.82 to 91.54 g/l (0.80 to 1.5 g/in$^3$).

It is preferred that the substrate of the diesel oxidation catalyst is a flow through substrate and comprises, more preferably consists of, a ceramic or metallic substance. More preferably the flow through substrate comprises, more preferably consists of, a ceramic substance, wherein the ceramic substance more preferably comprises, more preferably consists of, one or more of an alumina, a silica, a silicate, an aluminosilicate, more preferably a cordierite or a mullite, an aluminotitanate, a silicon carbide, a zirconia, a magnesia, more preferably a spinel, and a titanic, more preferably one or more of a silicon carbide and a cordierite, more preferably a cordierite. Alternatively, more preferably the flow through substrate comprises, more preferably consists of, a metallic substance, wherein more preferably the metallic substance comprises, more preferably consists of, oxygen and one or more of iron, chromium, and aluminum.

It is preferred that the substrate of the diesel oxidation catalyst has a substrate length in the range of from 2.54 to 25.4 cm (1 to 10 inches), more preferably in the range of from 5.08 to 20.32 cm (2 to 8 inches), more preferably in the range of from 10.16 to 19.05 cm (4 to 7.5 inches), more preferably in the range of from 12.7 to 17.78 cm (5 to 7 inches).

It is preferred that the substrate of the diesel oxidation catalyst has a substrate width in the range of from 12.7 to 45.72 cm (5 to 18 inches), more preferably in the range of from 20.32 to 40.64 cm (8 to 16 inches), more preferably in the range of from 25.4 to 35.56 cm (10 to 14 inches), more preferably in the range of from 27.94 to 33.02 cm (11 to 13 inches).

Preferably from 90 to 100 weight-%, more preferably 95 to 100 weight-%, more preferably 99 to 100 weight-% of the diesel oxidation catalyst consist of the coating and the substrate.

It is preferred that the exhaust gas treatment system further comprises an ammonia oxidation catalyst, wherein the ammonia oxidation catalyst is located downstream of the one or more selective catalytic reduction catalysts (B).

The present invention further relates to an exhaust gas treatment system for treating an exhaust gas stream exiting a diesel engine, said exhaust gas treatment system having an upstream end for introducing said exhaust gas stream into said exhaust gas treatment system, wherein said exhaust gas treatment system comprises
- a first selective catalytic reduction catalyst according to the present invention and one or more of a diesel oxidation catalyst, a second selective catalytic reduction catalyst, an ammonia oxidation catalyst and a filter, wherein the one or more of a diesel oxidation catalyst, a second selective catalytic reduction catalyst, an ammonia oxidation catalyst and a filter are located downstream of the first selective catalytic reduction according to the present invention, wherein preferably the first selective catalytic reduction catalyst according to the present invention is the first catalyst of the exhaust gas treatment system and is located downstream of the upstream end of said exhaust gas treatment system.

It is preferred that the exhaust gas treatment system comprises the first selective catalytic reduction catalyst according to the present invention and a filter, more preferably a catalyzed particulate filter, located downstream of said selective catalytic reduction catalyst. Alternatively, it is preferred that the exhaust gas treatment system preferably comprises the first selective catalytic reduction catalyst according to the present invention, a diesel oxidation catalyst and a filter, more preferably a catalyzed particulate filter, wherein the diesel oxidation catalyst is located downstream of said selective catalytic reduction catalyst and upstream of the filter.

The present invention further relates to a process for preparing a selective catalytic reduction catalyst, preferably the selective catalytic reduction catalyst according to the present invention, comprising (a) preparing a first slurry comprising a source of a 8-membered ring pore zeolitic material comprising one or more of copper and iron and water;

(b) disposing the first slurry obtained in (a) on the surface of the internal walls of a flow through substrate, the flow through substrate comprising an inlet end, an outlet end, a substrate axial length extending from the inlet end to the outlet end and a plurality of passages defined by internal walls of the substrate extending therethrough, which surface defines the interface between the internal walls and the passages, over 40 to 100% of the substrate axial length, obtaining a slurry-treated substrate;

(c) drying the slurry-treated substrate obtained in (b), obtaining the substrate having a first coating disposed thereon;

(d) optionally calcining the substrate having a first coating disposed thereon obtained in (c);

(e) preparing a second slurry comprising a first oxidic material comprising titania, and water, the first oxidic material optionally comprising one or more of cerium oxide, magnesium oxide, niobium oxide, silicon oxide and tungsten oxide, preferably tungsten oxide, the second slurry preferably comprising a second oxidic material;

(f) disposing, over 20 to 100% of the substrate axial length, preferably from the inlet end of the substrate toward the outlet end of the substrate, the second slurry obtained in (e) on the substrate having a first coating disposed thereon obtained in (c), optionally obtained in (d), obtaining a slurry-treated substrate;

(g) drying the slurry-treated substrate obtained in (f), obtaining the substrate having a first coating and a second coating disposed thereon;

(h) calcining the substrate having a first coating and a second coating thereon obtained in (g), wherein from 0 to 0.01 weight-% of the second coating consist of one or more vanadium oxides, calculated as $V_2O_5$, and wherein at least 75 weight-% of the second coating consist of titania, calculated as $TiO_2$, obtaining the selective catalytic reduction catalyst.

As to (a), it is preferred that it comprises
(a.1) mixing an oxidic binder, more preferably zirconyl acetate, with a 8-membered ring pore zeolitic material comprising one or more of copper and iron, and water, obtaining a first slurry;

(a.2) milling the first slurry obtained in (a.1) to a particle size Dv90, determined as described in Reference Example 1, in the range of from 3 to 15 micrometers, more preferably in the range of from 5 to 13 micrometers, more preferably in the range of from 8 to 12 micrometers.

According to (c), it is preferred that the slurry-treated substrate obtained in (b) is dried in gas atmosphere having a temperature in the range of from 90 to 200° C., more preferably in the range of from 100 to 150° C., more preferably in the range of from 110 to 130° C.

According to (c), it is preferred that the slurry-treated substrate obtained in (b) is dried in gas atmosphere for a duration in the range of from 5 to 60 minutes, more preferably in the range of from 10 to 20 minutes.

According to (c), it is preferred that the slurry-treated substrate obtained in (b) is further dried in gas atmosphere having a temperature in the range of from 90 to 200° C., more preferably in the range of from 130 to 190° C., more preferably in the range of from 155 to 175° C.

According to (c), it is preferred that the slurry-treated substrate obtained in (b) is further dried in gas atmosphere for a duration in the range of from 10 to 80 minutes, more preferably in the range of from 20 to 40 minutes.

As to (c), it is preferred that the gas atmosphere comprises, more preferably is, one or more of air, lean air, and oxygen, more preferably air.

According to (d), the substrate having a first coating disposed thereon obtained in (c) is preferably calcined in gas atmosphere having a temperature in the range of from 300 to 600° C., more preferably in the range of from 350 to 550° C., more preferably in the range of from 400 to 500° C.

According to (d), the substrate having a first coating disposed thereon obtained in (c) is preferably calcined in gas atmosphere for a duration in the range of from 10 to 80 minutes, more preferably in the range of from 20 to 40 minutes.

As to (d), it is preferred that the gas atmosphere comprises, more preferably is, one or more of air, lean air, and oxygen, more preferably air.

As to (e), it is preferred that it comprises
(e.1) mixing a first oxidic material comprising titania, and optionally comprising one or more of cerium oxide, magnesium oxide, niobium oxide, silicon oxide and tungsten oxide, more preferably tungsten oxide, with a second oxidic material, more preferably comprising one or more of alumina and silica, an organic dispersant and water;

(e.2) adjusting the pH, with the addition of an ammonium hydroxide solution, to a value in the range of from 3.0 to 7.0, more preferably in the range of from 5.0 to 6.0, obtaining the second slurry.

According to (g), it is preferred that the slurry-treated substrate obtained in (f) is dried in gas atmosphere having a temperature in the range of from 90 to 200° C., more preferably in the range of from 100 to 150° C., more preferably in the range of from 110 to 130° C.

According to (g), the slurry-treated substrate obtained in (f) is preferably dried in gas atmosphere for a duration in the range of from 5 to 60 minutes, more preferably in the range of from 10 to 20 minutes.

According to (g), it is preferred that the slurry-treated substrate obtained in (f) is further dried in gas atmosphere having a temperature in the range of from 90 to 200° C., more preferably in the range of from 130 to 190° C., more preferably in the range of from 155 to 175° C.

According to (g), it is preferred that the slurry-treated substrate obtained in (f) is further dried in gas atmosphere for a duration in the range of from 10 to 80 minutes, more preferably in the range of from 20 to 40 minutes.

As to (g), it is preferred that the gas atmosphere comprises, more preferably is, one or more of air, lean air, and oxygen, more preferably air.

According to (h), the substrate having a first coating and a second coating disposed thereon obtained in (g) is preferably calcined in gas atmosphere having a temperature in the range of from 300 to 600° C., more preferably in the range of from 350 to 550° C., more preferably in the range of from 400 to 500° C.

According to (h), the substrate having a first coating and a second coating disposed thereon obtained in (g) is preferably calcined in gas atmosphere for a duration in the range of from 10 to 80 minutes, more preferably in the range of from 20 to 40 minutes.

As to (h), it is preferred that the gas atmosphere comprises, more preferably is, one or more of air, lean air, and oxygen, more preferably air.

As to the process of the present invention, it is preferred that disposing one or more of the first slurry and the second slurry is carried out by spraying or immersing the substrate, more preferably immersing the substrate.

It is preferred that disposing the first slurry obtained in (a) is carried out over 90 to 100%, more preferably 95 to 100%, more preferably 99 to 100%, of the substrate axial length, more preferably from the inlet end of the substrate toward the outlet end of the substrate or more preferably from the outlet end of the substrate toward the inlet end of the substrate.

It is preferred that disposing the second slurry obtained in (f) is carried out over 90 to 100%, more preferably 95 to 100%, more preferably 99 to 100%, of the substrate axial length from the inlet end of the substrate toward the outlet end of the substrate. It is alternatively preferred that disposing the second slurry obtained in (f) is carried out over 20 to 90%, more preferably 30 to 80%, more preferably 40 to 60%, more preferably 45 to 55%, more preferably 48 to 52% of the substrate axial length from the inlet end of the substrate toward the outlet end of the substrate.

As an alternative, it is preferred that disposing the first slurry obtained in (a) is carried out over 40 to 50%, more preferably 45 to 50%, more preferably 48 to 50%, of the substrate axial length from the outlet end of the substrate toward the inlet end of the substrate and that disposing the second slurry obtained in (f) is carried out over 40 to 50%, more preferably 45 to 50%, more preferably 48 to 50%, of the substrate axial length from the inlet end of the substrate toward the outlet end of the substrate.

It is particularly preferred that the process of the present invention consists of (a) preparing a first slurry comprising a source of a 8-membered ring pore zeolitic material comprising one or more of copper and iron and water;

(b) disposing the first slurry obtained in (a) on the surface of the internal walls of a flow through substrate, the substrate comprising an inlet end, an outlet end, a substrate axial length extending from the inlet end to the outlet end and a plurality of passages defined by internal walls of the substrate extending therethrough, which surface defines the interface between the internal walls and the passages, over 40 to 100% of the substrate axial length, obtaining a slurry-treated substrate;

(c) drying the slurry-treated substrate obtained in (b), obtaining the substrate having a first coating disposed thereon;

(d) optionally calcining the substrate having a first coating disposed thereon obtained in (c);

(e) preparing a second slurry comprising a first oxidic material comprising titania, and water, the first oxidic material optionally comprising one or more of cerium oxide, magnesium oxide, niobium oxide, silicon oxide and tungsten oxide, preferably tungsten oxide, the second slurry preferably comprising a second oxidic material;

(f) disposing, over 20 to 100% of the substrate axial length, preferably from the inlet end of the substrate toward the outlet end of the substrate, the second slurry obtained in (e) on the substrate having a first coating disposed thereon obtained in (c), optionally obtained in (d), obtaining a slurry-treated substrate;

(g) drying the slurry-treated substrate obtained in (f), obtaining the substrate having a first coating and a second coating disposed thereon;

(h) calcining the substrate having a first coating and a second coating thereon obtained in (g), wherein from 0 to 0.01 weight-% of the second coating consist of one or more vanadium oxides, calculated as $V_2O_5$, and wherein at least 75 weight-% of the second coating consist of titania, calculated as $TiO_2$, obtaining the selective catalytic reduction catalyst.

The present invention further relates to a selective catalytic reduction catalyst, preferably the selective catalytic reduction catalyst of the present invention and as defined in the foregoing, obtainable or obtained by the process according to the present invention.

The present invention further relates to a use of the selective catalytic reduction catalyst according to the present invention for the selectively catalytically reduction of nitrogen oxides comprised in an exhaust gas stream, preferably from a diesel engine.

The present invention further relates to a use of the exhaust gas treatment system according to the present invention for the treatment of an exhaust gas stream from a diesel engine.

The present invention further relates to a method for selectively catalytically reducing nitrogen oxides, wherein the nitrogen oxides are comprised in an exhaust gas stream, said method comprising (1) providing the exhaust gas stream, preferably from a diesel engine;

(2) passing the exhaust gas stream provided in (1) through the selective catalytic reduction catalyst according to the present invention.

The present invention further relates to a method for treating an exhaust gas stream from a diesel engine, said method comprising (1') providing said exhaust gas stream;

(2') passing the exhaust gas stream provided in (1') through the exhaust gas treatment system according to the present invention.

The present invention is illustrated by the following set of embodiments and combinations of embodiments resulting from the dependencies and back-references as indicated. In particular, it is noted that in each instance where a range of embodiments is mentioned, for example in the context of a term such as "The selective catalytic reduction catalyst of any one of embodiments 1 to 3", every embodiment in this range is meant to be explicitly disclosed for the skilled person, i.e. the wording of this term is to be understood by the skilled person as being synonymous to "The selective catalytic reduction catalyst of any one of embodiments 1, 2 and 3".

1a. A selective catalytic reduction catalyst for the treatment of an exhaust gas of a diesel engine comprising:
(i) a flow through substrate comprising an inlet end, an outlet end, a substrate axial length extending from the inlet end to the outlet end and a plurality of passages defined by internal walls of the flow through substrate extending therethrough;
(ii) a first coating disposed on the surface of the internal walls of the substrate, which surface defines the interface between the internal walls and the passages, wherein the first coating extends over 40 to 100% of the substrate axial length, wherein the first coating comprises a zeolitic material comprising one or more of copper and iron, wherein the zeolitic material has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SW, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, preferably CHA, AEI, BEA, MFI, FAU, FER, RTH, LEV, DDR, KFI, ERI, AFX, a mixture of two or more thereof, and a mixed type of two or more thereof;

(iii) a second coating extending over 20 to 100% of the substrate axial length, wherein the second coating comprises a first oxidic material comprising titania, wherein at least 75 weight-% of the second coating consist of titania and wherein from 0 to 0.01 weight-% of the second coating consists of one or more vanadium oxides calculated as $V_2O_5$.

1. A selective catalytic reduction catalyst for the treatment of an exhaust gas of a diesel engine, preferably the selective catalytic reduction catalyst of embodiment 1a, comprising:
   (i) a flow through substrate comprising an inlet end, an outlet end, a substrate axial length extending from the inlet end to the outlet end and a plurality of passages defined by internal walls of the flow through substrate extending therethrough;
   (ii) a first coating disposed on the surface of the internal walls of the substrate, which surface defines the interface between the internal walls and the passages, wherein the first coating extends over 40 to 100% of the substrate axial length, wherein the first coating comprises an 8-membered ring pore zeolitic material comprising one or more of copper and iron;
   (iii) a second coating extending over 20 to 100% of the substrate axial length, wherein the second coating comprises a first oxidic material comprising titania, wherein at least 75 weight-% of the second coating consist of titania, calculated as $TiO_2$, and wherein from 0 to 0.01 weight-% of the second coating consists of one or more vanadium oxides, calculated as $V_2O_5$.

2. The selective catalytic reduction catalyst of embodiment 1, wherein the first coating according to (ii) extends over 50 to 100%, preferably over 75 to 100%, more preferably over 95 to 100%, more preferably over 98 to 100%, more preferably over 99 to 100% of the substrate axial length, more preferably from the inlet end toward the outlet end of the substrate or more preferably from the outlet end toward the inlet end of the substrate.

3. The selective catalytic reduction catalyst of embodiment 1 or 2, wherein the second coating according to (iii) extends from the inlet end toward the outlet end of the substrate.

4. The selective catalytic reduction catalyst of any one of embodiments 1 to 3, wherein the second coating according to (iii) extends over 50 to 100%, preferably over 75 to 100%, more preferably over 95 to 100%, more preferably over 98 to 100%, more preferably over 99 to 100%, of the substrate axial length, more preferably from the inlet end toward the outlet end of the substrate;
wherein the first coating according to (ii) more preferably extends over 99 to 100% of the substrate axial length and the second coating according to (iii) more preferably extends over 99 to 100% of the substrate axial length.

5. The selective catalytic reduction catalyst of embodiment 1 or 2, wherein the first coating according to (ii) extends over 98 to 100%, preferably over 99 to 100%, of the substrate axial length and the second coating according to (iii) extends over 20 to 90%, preferably 30 to 80%, more preferably 40 to 60%, more preferably over 45 to 55%, more preferably over 48 to 52% of the substrate axial length from the inlet end toward the outlet end of the substrate.

6. The selective catalytic reduction catalyst of any one of embodiments 1 to 5, wherein the second coating according to (iii) is disposed on the first coating according to (ii).

7. The selective catalytic reduction catalyst of embodiment 1, wherein the first coating according to (ii) extends over 40 to 50%, preferably 45 to 50%, more preferably 48 to 50% of the substrate axial length from the outlet end toward the inlet end of the substrate, and the second coating according to (iii) extends over 40 to 50%, preferably 45 to 50%, more preferably 48 to 50% of the substrate axial length from the inlet end toward the outlet end of the substrate.

8. The selective catalytic reduction catalyst of any one of embodiments 1 to 7, wherein the 8-membered ring pore zeolitic material contained in the first coating has a framework type selected from the group consisting of CHA, AEI, RTH, LEV, DDR, KFI, ERI, AFX, a mixture of two or more thereof and a mixed type of two or more thereof, preferably selected from the group consisting of CHA, AEI, RTH, a mixture of two or more thereof and a mixed type of two or more thereof, more preferably selected from the group consisting of CHA and AEI, wherein more preferably the 8-membered ring pore zeolitic material contained in the first coating has a framework type CHA, wherein the 8-membered ring pore zeolitic material is more preferably a zeolite SSZ-13.

9. The selective catalytic reduction catalyst of any one of embodiments 1 to 8, wherein the zeolitic material contained in the first coating comprises copper, wherein the amount of copper in the zeolitic material, calculated as CuO, is preferably in the range of from 0.1 to 10 weight-%, more preferably in the range of from 1.5 to 5.5 weight-%, more preferably in the range of from 2.5 to 4.5 weight-%, more preferably in the range of from 3.0 to 4.0 weight-%, more preferably in the range of from 3.0 to 3.5 weight-%, based on the total weight of the zeolitic material.

10. The selective catalytic reduction catalyst of embodiment 9, wherein the amount of iron comprised in the zeolitic material, calculated as $Fe_2O_3$, is in the range of from 0 to 0.01 weight-%, preferably in the range of from 0 to 0.001 weight-%, more preferably in the range of from 0 to 0.0001 weight-% based on the total weight of the zeolitic material.

11. The selective catalytic reduction catalyst of any one of embodiments 1 to 10, wherein from 95 to 100 weight-%, preferably from 98 to 100 weight-%, more preferably from 99 to 100 weight-% of the framework structure of the zeolitic material consist of Si, Al, O, and optionally H, wherein in the framework structure, the molar ratio of Si to Al, calculated as molar $SiO_2$:$Al_2O_3$, is preferably in the range of from 2:1 to 50:1, more preferably in the range of from 2:1 to 45:1.

12. The selective catalytic reduction catalyst of embodiment 11, wherein in the framework structure of the zeolitic material, the molar ratio of Si to Al, calculated as molar $SiO_2$:$Al_2O_3$, is in the range of from 10:1 to 40:1, preferably in the range of from 20:1 to 35:1, more preferably in the range of from 25:1 to 35:1.

13. The selective catalytic reduction catalyst of embodiment 11, wherein in the framework structure of the zeolitic material, the molar ratio of Si to Al, calculated as molar $SiO_2$:$Al_2O_3$, is in the range of from 2:1 to 15:1, preferably in the range of from 2:1 to 12:1, more preferably in the range of from 3:1 to 8:1.

14. The selective catalytic reduction catalyst of any one of embodiments 1 to 9, wherein the zeolitic material contained in the first coating comprises iron, wherein the amount of iron comprised in the zeolitic material, calculated as $Fe_2O_3$, is preferably in the range of from 0.1 to 10.0 weight-%, more preferably in the range of from 0.5 to 7.0 weight-%, more preferably in the range of from 1.0 to 5.5 weight-%, more preferably in the range of from 2.0 to 5.5 weight-%, based on the total weight of the zeolitic material, and wherein preferably from 95 to 100 weight-%, more preferably from 98 to 100 weight-%, more preferably from 99 to 100 weight-% of the framework structure of the zeolitic material consist of Si, Al, O, and optionally H, wherein in the framework structure, the molar ratio of Si to Al, calculated as molar $SiO_2$:$Al_2O_3$, is preferably in the range of from 2:1 to 50:1, more preferably in the range of from 2:1 to 45:1.

15. The selective catalytic reduction catalyst of embodiment 14, wherein in the framework structure of the zeolitic material, the molar ratio of Si to Al, calculated as molar $SiO_2$:$Al_2O_3$, is in the range of from 10:1 to 40:1, preferably in the range of from 20:1 to 35:1, more preferably in the range of from 25:1 to 35:1.

16. The selective catalytic reduction catalyst of embodiment 14, wherein in the framework structure of the zeolitic material, the molar ratio of Si to Al, calculated as molar $SiO_2$:$Al_2O_3$, is in the range of from 2:1 to 15:1, preferably in the range of from 2:1 to 12:1, more preferably in the range of from 3:1 to 8:1.

17. The selective catalytic reduction catalyst of any one of embodiments 1 to 16, wherein in the catalyst, the first coating comprises the zeolitic material at a loading in the range of from 0.5 to 5 g/in³, preferably in the range of from 1 to 4 g/in³, more preferably in the range of from 1.5 to 2.5 g/in³.

18. The selective catalytic reduction catalyst of any one of embodiments 1 to 17, wherein the first coating further comprises an oxidic binder, wherein the oxidic binder preferably comprises one or more of zirconia, alumina, titania, silica, and a mixed oxide comprising two or more of Zr, Al, Ti, and Si, more preferably comprises one or more of silica, alumina and zirconia, more preferably comprises one or more of alumina and zirconia, more preferably zirconia.

19. The selective catalytic reduction catalyst of embodiment 18, wherein in the catalyst, the first coating comprises the oxidic binder at a loading in the range of 0.05 to 0.15 g/in³, preferably in the range of from 0.08 to 0.14 g/in³.

20. The selective catalytic reduction catalyst of any one of embodiments 1 to 19, wherein from 95 to 100 weight-%, preferably from 98 to 100 weight-%, more preferably from 99 to 100 weight-%, more preferably from 99.5 to 100 weight-% of the first coating consist of a 8-membered ring pore zeolitic material comprising one or more of copper and iron, and preferably the oxidic binder according to embodiment 18 or 19.

21. The selective catalytic reduction catalyst of any one of embodiments 1 to 20, wherein from 0 to 0.01 weight-%, preferably from 0 to 0.001 weight-%, more preferably from 0 to 0.0001 weight-% of the first coating consist of titania, wherein the first coating is more preferably free of titania.

22. The selective catalytic reduction catalyst of any one of embodiments 1 to 20, wherein from 0 to 0.001 weight-%, preferably from 0 to 0.0001 weight-%, more preferably from 0.00001 weight-% of the framework structure of the zeolitic material comprised in the first coating consist of P.

23. The selective catalytic reduction catalyst of any one of embodiments 1 to 22, wherein the titania comprised in the first oxidic material of the second coating has one or more of a tetragonal crystal system and an orthorhombic crystal system, preferably a tetragonal crystal system, more preferably one or more of the rutile and the anatase structure, more preferably the anatase structure.

24. The selective catalytic reduction catalyst of any one of embodiments 1 to 23, wherein from 85 to 100 weight-%, preferably from 90 to 100 weight-%, more preferably from 95 to 100 weight-%, more preferably from 99 to 100 weight-% of the second coating consist of titania, wherein titania preferably has one or more of a tetragonal crystal system and an orthorhombic crystal system, more preferably a tetragonal crystal system, more preferably one or more of the rutile and the anatase structure, more preferably the anatase structure.

25. The selective catalytic reduction catalyst of any one of embodiments 1 to 24, wherein the first oxidic material of the second coating further comprises one or more of cerium oxide, magnesium oxide, niobium oxide, silicon oxide and tungsten oxide, preferably one or more of cerium oxide and tungsten oxide.

26. The selective catalytic reduction catalyst of embodiment 25, wherein the first oxidic material of the second coating further comprises tungsten oxide, wherein preferably the first oxidic material of the second coating comprises, more preferably consists of, tungsten oxide impregnated on the titania.

27. The selective catalytic reduction catalyst of embodiment 25 or 26, wherein from 90 to 100 weight-%, preferably from 95 to 100 weight-%, more preferably from 98 to 100 weight-%, more preferably from 99 to 100 weight-% of the first oxidic material of the second coating consist of titania, wherein titania preferably has one or more of a tetragonal crystal system and an orthorhombic crystal system, more preferably a tetragonal crystal system, more preferably one or more of the rutile and the anatase structure, more preferably the anatase structure, and optionally one or more of cerium oxide, magnesium oxide, niobium oxide, silicon oxide and tungsten oxide, preferably one or more of cerium oxide and tungsten oxide, more preferably tungsten oxide.

28. The selective catalytic reduction catalyst of embodiment 27, wherein from 99 to 100 weight-% of the first oxidic material of the second coating consist of from 80 to 95 weight-%, preferably from 85 to 92 weight-%, of titania and from 5 to 20 weight-%, preferably from 8 to 15 weight-%, of the one or more of cerium oxide, magnesium oxide, niobium oxide, silicon oxide and tungsten oxide, preferably tungsten oxide.

29. The selective catalytic reduction catalyst of any one of embodiments 1 to 28, wherein in the catalyst, the second coating comprises the first oxidic material at a loading in the range of from 15.26 to 305.1 g/l (0.25 to 5.0 g/in$^3$) more preferably in the range of from 30.51 to 244.1 g/l (0.5 to 4.0 g/in$^3$), more preferably in the range of from 45.8 to 213.6 g/l (0.75 to 3.5 g/in$^3$), more preferably in the range of from 48.8 to 183.1 g/l (0.8 to 3.0 g/in$^3$), more preferably in the range of from 54.9 to 122.05 g/l (0.9 to 2.0 g/in$^3$).

30. The selective catalytic reduction catalyst of any one of embodiments 1 to 29, wherein the second coating further comprises a second oxidic material comprising one or more of silica, alumina, zirconia, and ceria, preferably one or more of silica and alumina.

31. The selective catalytic reduction catalyst of embodiment 30, wherein the second oxidic material comprises, preferably consists of, alumina and silica, preferably gamma-alumina and silica, wherein the alumina, preferably the gamma-alumina, optionally contains silicon or wherein the second oxidic material comprises, preferably consists of, silica.

32. The selective catalytic reduction catalyst of embodiment 30 or 31, wherein in the catalyst, the second coating comprises the second oxidic material at a loading in the range of from 0.61 to 36.6 g/l (0.01 to 0.6 g/in$^3$), more preferably in the range of from 1.22 to 24.4 g/l (0.02 to 0.4 g/in$^3$), more preferably in the range of from 3.05 to 21.36 g/l (0.05 to 0.35 g/in$^3$).

33. The selective catalytic reduction catalyst of any one of embodiments 1 to 32, wherein from 90 to 100 weight-%, preferably from 95 to 100 weight-%, more preferably from 98 to 100 weight-%, more preferably from 99 to 100 weight-% of the second coating consist of the first oxidic material and the second oxidic material according to any one of embodiments 30 to 32.

34. The selective catalytic reduction catalyst of any one of embodiments 1 to 33, wherein from 0 to 0.1 weight-%, preferably from 0 to 0.01 weight-%, more preferably from 0 to 0.001 weight-% of the second coating consist of a zeolitic material, wherein the second coating is more preferably free of a zeolitic material.

35. The selective catalytic reduction catalyst of embodiment 34, wherein the zeolitic material comprises one or more of copper and iron.

36. The selective catalytic reduction catalyst of any one of embodiments 1 to 35, wherein from 0 to 0.001 weight-%, preferably from 0 to 0.0001 weight-%, of the second coating consist of one or more vanadium oxides, wherein, more preferably, the second coating is free of vanadium oxides.

37. The selective catalytic reduction catalyst of any one of embodiments 1 to 36, wherein from 0 to 0.001 weight-%, preferably from 0 to 0.0001 weight-% of the second coating consist of one or more of platinum and palladium, preferably of one or more of platinum, palladium and rhodium, more preferably of one or more of noble metals.

38. The selective catalytic reduction catalyst of any one of embodiments 1 to 37, wherein from 95 to 100 weight-%, preferably from 98 to 100 weight-%, more preferably from 99 to 100 weight-% of the first coating consist of a zeolitic material having a framework type CHA and comprising copper, and preferably the oxidic binder according to embodiment 18 or 19; and
wherein from 90 to 100 weight-%, preferably from 95 to 100 weight-%, more preferably from 98 to 100 weight-%, more preferably from 99 to 100 weight-% of the second coating consist of the first oxidic material and the second oxidic material according to any one of embodiments 30 to 32;
wherein from 95 to 100 weight-%, preferably from 98 to 100 weight-%, more preferably from 99 to 100 weight-%, of the first oxidic material consist of titania, wherein titania preferably has one or more of a tetragonal crystal system and an orthorhombic crystal system, more preferably a tetragonal crystal system, more preferably one ore more of the rutile and the anatase structure, more preferably the anatase structure, and the second oxidic material comprises, preferably consists of, one or more of alumina and silica.

39. The selective catalytic reduction catalyst of any one of embodiments 1 to 37, wherein from 95 to 100 weight-%, preferably from 98 to 100 weight-%, more preferably from 99 to 100 weight-% of the first coating consist of a zeolitic material having a framework type CHA and comprising copper, and preferably the oxidic binder according to embodiment 18 or 19; and
wherein from 90 to 100 weight-%, preferably from 95 to 100 weight-%, more preferably from 98 to 100 weight-%, more preferably from 99 to 100 weight-% of the second coating consist of the first oxidic material and the second oxidic material according to any one of embodiments 30 to 32;
wherein from 95 to 100 weight-%, preferably from 98 to 100 weight-%, more preferably from 99 to 100 weight-% of the first oxidic material consist of titania and tungsten oxide, wherein titania preferably has one or more of a tetragonal crystal system and an orthorhombic crystal system, more preferably a tetragonal crystal system, more preferably one ore more of the rutile and the anatase structure, more preferably the anatase structure; wherein more preferably from 99 to 100 weight-% of the first oxidic material consist of from 80 to 95 weight-%, more preferably from 85 to 92 weight-%, of titania and from 5 to 20 weight-%, more preferably from 8 to 15 weight-%, of tungsten oxide, and the second oxidic material comprises, preferably consists of, one or more of alumina and silica.

40. The selective catalytic reduction catalyst of any one of embodiments 1 to 39, wherein in the catalyst, the first coating has a total loading (l1) and the second coating has a total loading (l2), wherein the ratio of the total loading of the first coating relative to the total loading of the second coating, (l1): (l2), is in the range of from 0.5:1 to 5:1, preferably in the range of from 0.75:1 to 3:1, more preferably in the range of from 1:1 to 2:1.

41. The selective catalytic reduction catalyst of any one of embodiments 1 to 40, wherein the flow through substrate comprises, preferably consists of, a ceramic or metallic substance.

42. The selective catalytic reduction catalyst of embodiment 41, wherein the flow through substrate comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite.

43. The selective catalytic reduction catalyst of embodiment 41, wherein the flow through substrate comprises, preferably consists of, a metallic substance, wherein the metallic substance preferably comprises, more preferably consists of, oxygen and one or more of iron, chromium, and aluminum.

44. The selective catalytic reduction catalyst of any one of embodiments 1 to 43, wherein the substrate has a substrate length in the range of from 2.54 to 25.4 cm (1 to 10 inches), preferably in the range of from 5.08 to 20.32 cm (2 to 8 inches), more preferably in the range of from 10.16 to 19.05 cm (4 to 7.5 inches), more preferably in the range of from 12.7 to 17.78 cm (5 to 7 inches).

45. The selective catalytic reduction catalyst of any one of embodiments 1 to 44, wherein the substrate has a substrate width in the range of from 10.16 to 43.18 cm (4 to 17 inches), preferably in the range of from 17.78 to 38.10 cm (7 to 15 inches), more preferably in the range of from 20.32 to 35.56 cm (8 to 14 inches), more preferably in the range of from 22.86 to 33.02 cm (9 to 13 inches), more preferably in the range of from 22.86 to 27.94 cm (9 to 11 inches).

46. The selective catalytic reduction catalyst of any one of embodiments 1 to 45, wherein from 95 to 100 weight-%, preferably from 98 to 100 weight-%, more preferably from 99 to 100 weight-%, more preferably from 99.5 to 100 weight-% of the selective catalytic reduction catalyst consist of the flow through substrate, the first coating and the second coating.

47. An exhaust gas treatment system for treating an exhaust gas stream exiting a diesel engine, said exhaust gas treatment system having an upstream end for introducing said exhaust gas stream into said exhaust gas treatment system, wherein said exhaust gas treatment system comprises
    (A) a diesel oxidation catalyst (DOC), wherein the diesel oxidation catalyst comprises a coating disposed on a substrate, wherein the coating preferably comprises one or more of palladium, platinum and rhodium, more preferably palladium and platinum, more preferably platinum, supported on an oxidic material;
    (B) one or more selective catalytic reduction (SCR) catalysts according to any one of embodiments 1 to 46;
    wherein the diesel oxidation catalyst according to (A) is located upstream of the one or more selective catalytic reduction catalysts according to (B), wherein preferably diesel oxidation catalyst according to (A) is the first catalyst of the exhaust gas treatment system and is located downstream of the upstream end of said exhaust gas treatment system; wherein the exhaust gas treatment system optionally further comprises a filter, preferably a catalyzed soot filter, which is located downstream of the diesel oxidation catalyst according to (A) and upstream of the one or more selective catalytic reduction catalyst according to (B).

48. The exhaust gas treatment system of embodiment 47, wherein the oxidic material comprised in the coating of the diesel oxidation catalyst comprises one or more of zirconia, alumina, titania and silica, preferably one or more of zirconia and titania, more preferably titania.

49. The exhaust gas treatment system of embodiment 47 or 48, wherein the coating of the diesel oxidation catalyst further comprises one or more of alumina, silica and zirconia, preferably one or more of alumina and zirconia, more preferably alumina and zirconia.

50. The exhaust gas treatment system of any one of embodiments 47 to 49, wherein from 90 to 100 weight-%, preferably from 95 to 100 weight-%, more preferably from 99 to 100 weight-% of the coating of the diesel oxidation catalyst consist of one or more of palladium, platinum and rhodium supported on an oxidic material, preferably titania, and preferably one or more of alumina, silica and zirconia, preferably one or more of alumina and zirconia, more preferably alumina and zirconia.

51. The exhaust gas treatment system of any one of embodiments 47 to 50, wherein the coating of the diesel oxidation catalyst comprises one or more of palladium, platinum and rhodium at a loading in said catalyst in the range of from 0.11 to 1.10 g/l (3 to 30 g/ft$^3$), preferably in the range of from 0.18 to 0.71 g/l (5 to 20 g/ft$^3$), more preferably in the range of from 0.28 to 0.42 g/l (8 to 12 g/ft$^3$).

52. The exhaust gas treatment system of any one of embodiments 47 to 51, wherein the coating of the diesel oxidation catalyst comprises the oxidic material, supporting the one or more of palladium, platinum and rhodium, at a loading in said catalyst in the range of from 30.51 g/l to 305.1 g/l (0.5 to 5 g/in$^3$), preferably in the range of from 45.77 to 122.05 g/l (0.75 to 2 g/in$^3$), more preferably in the range of from 48.82 to 91.54 g/l (0.80 to 1.5 g/in$^3$).

53. The exhaust gas treatment system of any one of embodiments 47 to 52, wherein the substrate of the diesel oxidation catalyst is a flow through substrate and comprises, preferably consists of, a ceramic or metallic substance.

54. The exhaust gas treatment system of embodiment 54, wherein the flow through substrate comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite; or wherein the flow through substrate comprises, preferably consists of, a metallic substance, wherein preferably the metallic substance comprises, more preferably consists of, oxygen and one or more of iron, chromium, and aluminum.

55. The exhaust gas treatment system of any one of embodiments 47 to 54, wherein the substrate of the diesel oxidation catalyst has a substrate length in the range of from 2.54 to 25.4 cm (1 to 10 inches), preferably in the range of from 5.08 to 20.32 cm (2 to 8 inches), more preferably in the range of from 10.16 to 19.05 cm (4 to 7.5 inches), more preferably in the range of from 12.7 to 17.78 cm (5 to 7 inches).

56. The exhaust gas treatment system of any one of embodiments 47 to 55, wherein the substrate of the diesel oxidation catalyst has a substrate width in the range of from 12.7 to 45.72 cm (5 to 18 inches), preferably in the range of from 20.32 to 40.64 cm (8 to 16 inches), more preferably in the range of from 25.4 to 35.56 cm (10 to 14 inches), more preferably in the range of from 27.94 to 33.02 cm (11 to 13 inches).

57. The exhaust gas treatment system of any one of embodiments 47 to 56, wherein from 90 to 100 weight-%, preferably 95 to 100 weight-%, more preferably 99 to 100 weight-% of the diesel oxidation catalyst consist of the coating and the substrate.

58. The exhaust gas treatment system of any one of embodiments 47 to 57 further comprising an ammonia oxidation catalyst, wherein the ammonia oxidation catalyst is located downstream of the one or more selective catalytic reduction catalysts (B).

59. An exhaust gas treatment system for treating an exhaust gas stream exiting a diesel engine, said exhaust gas treatment system having an upstream end for introducing said exhaust gas stream into said exhaust gas treatment system, wherein said exhaust gas treatment system comprises
a first selective catalytic reduction catalyst according to any one of embodiments 1 to 46 and one or more of a diesel oxidation catalyst, a second selective catalytic reduction catalyst, an ammonia oxidation catalyst and a filter,
wherein the one or more of a diesel oxidation catalyst, a second selective catalytic reduction catalyst, an ammonia oxidation catalyst and a filter are located downstream of the first selective catalytic reduction, wherein preferably the first selective catalytic reduction catalyst is the first catalyst of the exhaust gas treatment system and is located downstream of the upstream end of said exhaust gas treatment system;
wherein the exhaust gas treatment system more preferably comprises the first selective catalytic reduction catalyst and a filter, more preferably a catalyzed particulate filter, located downstream of said selective catalytic reduction catalyst, or
wherein the exhaust gas treatment system more preferably comprises the first selective catalytic reduction catalyst, a diesel oxidation catalyst and a filter, more preferably a catalyzed particulate filter, wherein the diesel oxidation catalyst is located downstream of said selective catalytic reduction catalyst and upstream of the filter.

60. A process for preparing a selective catalytic reduction catalyst, preferably the selective catalytic reduction catalyst of any one of embodiments 1 to 46, comprising (a) preparing a first slurry comprising a source of a 8-membered ring pore zeolitic material comprising one or more of copper and iron and water;
(b) disposing the first slurry obtained in (a) on the surface of the internal walls of a flow through substrate, the flow through substrate comprising an inlet end, an outlet end, a substrate axial length extending from the inlet end to the outlet end and a plurality of passages defined by internal walls of the substrate extending therethrough, which surface defines the interface between the internal walls and the passages, over 40 to 100% of the substrate axial length, obtaining a slurry-treated substrate;
(c) drying the slurry-treated substrate obtained in (b), obtaining the substrate having a first coating disposed thereon;
(d) optionally calcining the substrate having a first coating disposed thereon obtained in (c);
(e) preparing a second slurry comprising a first oxidic material comprising titania, and water, the first oxidic material optionally comprising one or more of cerium oxide, magnesium oxide, niobium oxide, silicon oxide and tungsten oxide, preferably tungsten oxide, the second slurry preferably comprising a second oxidic material;
(f) disposing, over 20 to 100% of the substrate axial length, preferably from the inlet end of the substrate toward the outlet end of the substrate, the second slurry obtained in (e) on the substrate having a first coating disposed thereon obtained in (c), optionally obtained in (d), obtaining a slurry-treated substrate;
(g) drying the slurry-treated substrate obtained in (f), obtaining the substrate having a first coating and a second coating disposed thereon;
(h) calcining the substrate having a first coating and a second coating thereon obtained in (g), wherein from 0 to 0.01 weight-% of the second coating consist of one or more vanadium oxides, calculated as $V_2O_5$, and wherein at least 75 weight-% of the second coating consist of titania, calculated as TiO2, obtaining the selective catalytic reduction catalyst.

61. The process of embodiment 60, wherein (a) comprises
(a.1) mixing an oxidic binder, preferably zirconyl acetate, with a 8-membered ring pore zeolitic material comprising one or more of copper and iron, and water, obtaining a first slurry;
(a.2) milling the first slurry obtained in (a.1) to a particle size Dv90, determined as described in Reference Example 1, in the range of from 3 to 15 micrometers, preferably in the range of from 5 to 13 micrometers, more preferably in the range of from 8 to 12 micrometers.

62. The process of embodiment 60 or 61, wherein according to (c), the slurry-treated substrate obtained in (b) is dried in gas atmosphere having a temperature in the range of from 90 to 200° C., preferably in the range of from 100 to 150° C., more preferably in the range of from 110 to 130° C.

63. The process of any one of embodiments 60 to 62, wherein according to (c), the slurry-treated substrate obtained in (b) is dried in gas atmosphere for a duration in the range of from 5 to 60 minutes, preferably in the range of from 10 to 20 minutes.

64. The process of embodiments 62 or 63, wherein according to (c), the slurry-treated substrate obtained in (b) is further dried in gas atmosphere having a temperature in the range of from 90 to 200° C., preferably 65. The process of any one of embodiments 62 to 64, wherein according to (c), the slurry-treated substrate obtained in (b) is further dried in gas atmosphere for a duration in the range of from 10 to 80 minutes, preferably in the range of from 20 to 40 minutes.
66. The process of any one of embodiments 62 to 65, wherein the gas atmosphere in (c) comprises, preferably is, one or more of air, lean air, and oxygen, more preferably air.
67. The process of any one of embodiments 60 to 66, wherein according to (d), the substrate having a first coating disposed thereon obtained in (c) is calcined in gas atmosphere having a temperature in the range of from 300 to 600 ° C., preferably in the range of from 350 to 550° C., more preferably in the range of from 400 to 500° C.
68. The process of any one of embodiments 60 to 67, wherein according to (d), the substrate having a first coating disposed thereon obtained in (c) is calcined in gas atmosphere for a duration in the range of from 10 to 80 minutes, preferably in the range of from 20 to 40 minutes.
69. The process of embodiment 67 or 68, wherein the gas atmosphere in (d) comprises, preferably is, one or more of air, lean air, and oxygen, more preferably air.
70. The process of any one of embodiments 60 to 69, wherein (e) comprises
    (e.1) mixing a first oxidic material comprising titania, and optionally comprising one or more of cerium oxide, magnesium oxide, niobium oxide, silicon oxide and tungsten oxide, preferably tungsten oxide, with a second oxidic material, preferably comprising one or more of alumina and silica, an organic dispersant and water;
    (e.2) adjusting the pH, with the addition of an ammonium hydroxide solution, to a value in the range of from 3.0 to 7.0, preferably in the range of from 5.0 to 6.0, obtaining the second slurry.
71. The process of any one of embodiments 60 to 70, wherein according to (g), the slurry-treated substrate obtained in (f) is dried in gas atmosphere having a temperature in the range of from 90 to 200° C., preferably in the range of from 100 to 150° C., more preferably in the range of from 110 to 130° C.
72. The process of any one of embodiment 60 to 71, wherein according to (g), the slurry-treated substrate obtained in (f) is dried in gas atmosphere for a duration in the range of from 5 to 60 minutes, preferably in the range of from 10 to 20 minutes.
73. The process of embodiments 71 or 72, wherein according to (g), the slurry-treated substrate obtained in (f) is further dried in gas atmosphere having a temperature in the range of from 90 to 200° C., preferably in the range of from 130 to 190° C., more preferably in the range of from 155 to 175° C.
74. The process of any one of embodiments 71 to 73, wherein according to (g), the slurry-treated substrate obtained in (f) is further dried in gas atmosphere for a duration in the range of from 10 to 80 minutes, preferably in the range of from 20 to 40 minutes.
75. The process of any one of embodiments 71 to 74, wherein the gas atmosphere in (g) comprises, preferably is, one or more of air, lean air, and oxygen, more preferably air.
76. The process of any one of embodiments 60 to 75, wherein according to (h), the substrate having a first coating and a second coating disposed thereon obtained in (g) is calcined in gas atmosphere having a temperature in the range of from 300 to 600° C., preferably in the range of from 350 to 550° C., more preferably in the range of from 400 to 500° C.
77. The process of any one of embodiments 60 to 76, wherein according to (h), the substrate having a first coating and a second coating disposed thereon obtained in (g) is calcined in gas atmosphere for a duration in the range of from 10 to 80 minutes, preferably in the range of from 20 to 40 minutes.
78. The process of embodiment 76 or 77, wherein the gas atmosphere in (h) comprises, preferably is, one or more of air, lean air, and oxygen, more preferably air.
79. The process of any one of embodiments 60 to 78 comprising disposing one or more of the first slurry and the second slurry by spraying or immersing the substrate, preferably immersing the substrate.
80. The process of any one of embodiments 60 to 79 comprising disposing the first slurry obtained in (a) over 90 to 100%, preferably 95 to 100%, more preferably 99 to 100%, of the substrate axial length, preferably from the inlet end of the substrate toward the outlet end of the substrate or preferably from the outlet end of the substrate toward the inlet end of the substrate.
81. The process of any one of embodiments 60 to 80 comprising disposing the second slurry obtained in (f) over 90 to 100%, preferably 95 to 100%, more preferably 99 to 100%, of the substrate axial length from the inlet end of the substrate toward the outlet end of the substrate; or
    over 20 to 90%, preferably 30 to 80%, more preferably 40 to 60%, more preferably 45 to 55%, more preferably 48 to 52% of the substrate axial length from the inlet end of the substrate toward the outlet end of the substrate.
82. The process of any one of embodiments 60 to 79 comprising disposing the first slurry obtained in (a) over 40 to 50%, preferably 45 to 50%, more preferably 48 to 50%, of the substrate axial length from the outlet end of the substrate toward the inlet end of the substrate and disposing the second slurry obtained in (f) over 40 to 50%, preferably 45 to 50%, more preferably 48 to 50%, of the substrate axial length from the inlet end of the substrate toward the outlet end of the substrate.
83. The process of any one of embodiments 60 to 82, consisting of
    (a) preparing a first slurry comprising a source of a 8-membered ring pore zeolitic material comprising one or more of copper and iron and water;
    (b) disposing the first slurry obtained in (a) on the surface of the internal walls of a flow through substrate, the substrate comprising an inlet end, an outlet end, a substrate axial length extending from the inlet end to the outlet end and a plurality of passages defined by internal walls of the substrate extending therethrough, which surface defines the interface between the internal walls and the passages, over 40 to 100% of the substrate axial length, obtaining a slurry-treated substrate;
    (c) drying the slurry-treated substrate obtained in (b), obtaining the substrate having a first coating disposed thereon;
    (d) optionally calcining the substrate having a first coating disposed thereon obtained in (c);

(e) preparing a second slurry comprising a first oxidic material comprising titania, and water, the first oxidic material optionally comprising one or more of cerium oxide, magnesium oxide, niobium oxide, silicon oxide and tungsten oxide, preferably tungsten oxide, the second slurry preferably comprising a second oxidic material;

(f) disposing, over 20 to 100% of the substrate axial length, preferably from the inlet end of the substrate toward the outlet end of the substrate, the second slurry obtained in (e) on the substrate having a first coating disposed thereon obtained in (c), optionally obtained in (d), obtaining a slurry-treated substrate;

(g) drying the slurry-treated substrate obtained in (f), obtaining the substrate having a first coating and a second coating disposed thereon;

(h) calcining the substrate having a first coating and a second coating thereon obtained in (g), wherein from 0 to 0.01 weight-% of the second coating consist of one or more vanadium oxides, calculated as $V_2O_5$, and wherein at least 75 weight-% of the second coating consist of titania, calculated as $TiO_2$, obtaining the selective catalytic reduction catalyst.

84. A selective catalytic reduction catalyst, preferably the selective catalytic reduction catalyst of any one of embodiments 1 to 46, obtainable or obtained by the process according to any one of embodiments 60 to 83, preferably according to embodiment 83.

85. Use of the selective catalytic reduction catalyst according any one of embodiments 1 to 46 and 84 for the selectively catalytically reduction of nitrogen oxides comprised in an exhaust gas stream, preferably from a diesel engine.

86. Use of the exhaust gas treatment system according to any one of embodiments 47 to 59 for the treatment of an exhaust gas stream from a diesel engine.

87. A method for selectively catalytically reducing nitrogen oxides, wherein the nitrogen oxides are comprised in an exhaust gas stream, said method comprising
  (1) providing the exhaust gas stream, preferably from a diesel engine;
  (2) passing the exhaust gas stream provided in (1) through the selective catalytic reduction catalyst according to any one of embodiments 1 to 46 and 84.

88. A method for treating an exhaust gas stream from a diesel engine, said method comprising
  (1') providing said exhaust gas stream;
  (2') passing the exhaust gas stream provided in (1') through the exhaust gas treatment system according to any one of embodiments 47 to 59.

In the context of the present invention, the term "the surface of the internal walls" is to be understood as the "naked" or "bare" or "blank" surface of the walls, i.e. the surface of the walls in an untreated state which consists—apart from any unavoidable impurities with which the surface may be contaminated—of the material of the walls.

The present invention is further illustrated by the following Examples, Reference Examples, and Comparative Examples.

EXAMPLES

Reference Example 1: Determination of the Dv90 Values

The particle size distributions were determined by a static light scattering method using Sympatec HELOS equipment, wherein the optical concentration of the sample was in the range of from 5 to 10%.

Reference Example 2: Preparation of a Cu-CHA Zeolite

The zeolitic material having the framework structure type CHA comprising Cu and used in the examples herein was prepared according to the teaching of U.S. Pat. No. 8,293,199 B2. Particular reference is made to Inventive Example 2 of U.S. Pat. No. 8,293,199 B2, column 15, lines 26 to 52.

Reference Example 3: Preparation of a DOC Catalyst

Firstly, alumina (delta and theta phase; a BET specific surface area of 95 $m^2/g$, a total pore volume of 0.47 ml/g, and a Dv90 of 125 micrometers) was combined dropwise with nitric acid (50% solution), an amount which corresponds to 2 weight-% of the alumina amount. After the nitric acid, distilled water was added to the alumina until the solid content reaches 93 weight-%, forming an alumina-mixture.

Separately, distilled water, acetic acid (4 times the volume of the platinum precursor solution was added to titania) and zirconium hydroxide (a solid content of 52 weight-%, a BET specific surface area >30 $m^3/g$, and a Dv90 of 45 micrometers; the total zirconia mass, calculated as $ZrO_2$, represents 12 weight-% of the final mass of the catalyst after calcination) were mixed together. The pH of the mixture was adjusted to 3.5 by adding acetic acid. To this mixture, the alumina-mixture was added along with the zirconia acetate solution (30 weight-% solids, total zirconia mass from zirconia acetate, calculated as $ZrO_2$, represents 3 weight-% of the final mass of the catalyst after calcination). Acetic acid was added to adjust the pH of the resulting slurry to 3.5. The slurry was then milled until the resulting Dv90 determined as described in Reference Example 1 herewith was of 10 micrometers.

Separately, a solution of distilled water and monoethanolamine (MEA) (0.2% of the dry amount of titania) and a platinum precursor, namely an amine stabilized hydroxo Pt(IV) complex, with a solid content of 16.6 weight-% were mixed. To this mixture, titania ($TiO_2$, anatase phase, having a BET specific surface area of 110 $m^2/g$ and an average pore diameter >10 nm) was added forming a slurry. The final titania loading in the catalyst after calcination corresponds to 1 g/$in^3$. Further, a 1:1 mixture acetic acid (⅕ the volume of the platinum precursor solution) and distilled water was added to the slurry.

The milled alumina-zirconia slurry was added to the Pt-titania slurry. After, a 1:1 mixture of distilled water and sucrose (0.6 weight-% of the final mass of the catalyst after calcination) was also added to the slurry. This was followed by the addition of octanol (2 weight-% of the final mass of the catalyst after calcination). An alumina binder (solid content of 80 weight-%, a BET specific surface of 185 $m^2/g$, a Dv80 of 45 micrometers) was further added to the amount of 0.1 weight-% of the final mass of the catalyst after calcination. Finally, monoethanolamine (MEA) was again added to the resulting slurry (1 weight-% of the final titania loading in the catalyst after calcination) and distilled water was added to obtain a final slurry solid content of 41 weight-%.

The final slurry was then disposed over the full length of an uncoated honeycomb cordierite monolith substrate using the coating method described in Reference Example 4 below (diameter 30.48 cm (12 inches)×length: 15.24 cm (6 inches) cylindrically shaped substrate with $300/(2.54)^2$ cells per square centimeter and 0.127 millimeter (5 mil) wall thickness). Afterwards, the substrate was dried at a temperature of 125° C. for 15 minutes and 165° C. for 30 minutes and calcined at a temperature of 590° C. for 30 minutes. The washcoat loading in the catalyst after calcination was of 106.79 g/l (1.75 g/in$^3$), including 61.02 g/l (1.0 g/in$^3$) of titania, 29.47 g/l (0.483 g/in$^3$) of delta/theta alumina, 15.26 g/l (0.25 g/in$^3$) of zirconia and 1.04 g/l (0.017 g/in$^3$) of alpha-alumina. The platinum content in the catalyst after calcination was of 10 g/ft$^3$.

Reference Example 4 General Coating Method

In order to coat a flow-through substrate with one or more coatings, the flow-through substrate was immersed vertically in a portion of a given slurry for a specific length of the substrate. In this manner, the washcoat contacted the walls of the substrate. The sample was left in the slurry for a specific period of time, usually for 1-10 seconds. Vacuum was applied to draw the slurry into the substrate. The substrate was then removed from the slurry, and was inverted and excess slurry was removed from the substrate by allowing it to drain from the substrate, then by blowing with compressed air for better distribution.

Example 1 Preparing a SCR Catalyst a) Preparing a Fresh SCR Catalyst According to the Present Invention
First Coating (Bottom Coating)
Zirconyl-acetate mixture with a solid content of 30% by weight, such that the final zirconia loading (calculated as $ZrO_2$) in the catalyst after calcination was of 7.02 g/l (0.115 g/in$^3$), was mixed with a Cu-CHA zeolite (3.25 weight-% of Cu calculated as CuO and a $SiO_2$:$Al_2O_3$ molar ratio of 32), prepared essentially as in Reference Example 2 and corresponding to a final Cu-CHA loading in the catalyst after calcination of 133.34 g/l (2.185 g/in$^3$), and deionized water. The resulting slurry was then milled until the resulting Dv90 determined as described in Reference Example 1 herewith was 10 micrometers.

The slurry was then disposed over the full length of an uncoated honeycomb cordierite monolith substrate using the coating method described in Reference Example 4 (diameter 26.67 cm (10.5 inches) x length: 15.24 cm (6 inches) cylindrically shaped substrate with $600/(2.54)^2$ cells per square centimeter and 0.086 millimeter (3.4 mil) wall thickness) to obtain a first coating. Afterwards, the substrate was dried at 120° C. for 15 minutes and at 165° C. for 30 minutes and then calcined at 450° C. for 30 minutes. The washcoat loading of the first coating in the catalyst after calcination was of 140.35 g/l (2.3 g/in$^3$), including 133.34 g/l (2.185 g/in$^3$) of Cu-CHA and 7.02 g/l (0.115 g/in$^3$) of zirconia.
Second Coating (Top Coating)
A mixture with a solid content of 40 weight-% was prepared with water and Si-containing gamma-alumina (gamma-$Al_2O_3$ with 5 weight-% of silica and having a BET specific surface area of 180 m$^2$/g, a Dv90 of 90 micrometers, a total pore volume of 0.63 ml/g), corresponding to a final Si-containing alumina loading in the catalyst after calcination of 0.11 g/in$^3$, and was milled until the resulting Dv90 determined as described in Reference Example 1 herewith was 12 micrometers.

Separately, distilled water was mixed with an organic dispersant with an active content of 39 weight-% and a pH of 8. The amount of dispersant was calculated as 3% by weight based on the titania (as $TiO_2$) dry weight. To this, titania ($TiO_2$—anatase phase) was added to form a titania slurry, such that the final titania loading in the catalyst after calcination was of 1.05 g/in$^3$. The gamma-alumina mixture was then added to the titania slurry with a titania colloid binder (a solid content of 17 weight-%, a pH of 1, D50 of 35 micrometers) in an amount corresponding to a final loading in the catalyst after calcination of 0.01 g/in$^3$.

The pH was set to 5.0 by the addition of an ammonium hydroxide solution. Finally, a colloidal silica binder (a solid content of 40 weight-%, a pH of 9.25, a BET specific surface area of 142 m$^2$/g) was added to the slurry such that the final loading of silica in the catalyst after calcination was of 0.03 g/in$^3$. Distilled water was also added to obtain a final slurry with a solid content of 38 weight-%.

The final slurry was then disposed over the full length of the first coating to obtain a second coating using the coating method described in Reference Example 4. Afterwards, the substrate was dried at 120° C. for 15 minutes and at 165° C. for 30 minutes and then calcined at 450° C. for 30 minutes. The washcoat loading of the second coating after calcination in the catalyst was of 73.23 g/l (1.2 g/in$^3$), including 64.69 g/l (1.06 g/in$^3$) of titania, 6.71 g/l (0.11 g/in$^3$) of Si-stabilized gamma-alumina and 1.83 g/l (0.03 g/in$^3$) of silica.
b) Ageing the Catalyst Obtained in a)
The catalyst obtained in a) was further aged in air at 650° C. for 50 hours.

Comparative Example 1: Preparing a SCR Catalyst Not According to the Present Invention First Coating (Bottom Coating)
Zirconyl-acetate mixture with a solid content of 30% by weight such that the final zirconia loading (calculated as $ZrO_2$) in the catalyst is 3.97 g/l (0.065 g/in$^3$) was mixed with a Cu-CHA zeolite (3.25 weight-% of Cu calculated as CuO and a $SiO_2$:$Al_2O_3$ molar ratio of 32), prepared essentially as in Reference Example 2 and corresponding to a final Cu-CHA loading in the catalyst of 75.67 g/l (1.24 g/in$^3$), and deionized water. The resulting slurry was then milled until the resulting Dv90 determined as described in Reference Example 1 herewith was 10 micrometers.

The slurry was then disposed over the full length of an uncoated honeycomb cordierite monolith substrate using the coating method described in Reference Example 4 (diameter: 26.67 cm (10.5 inches)×length: 15.24 cm (6 inches) cylindrically shaped substrate with $600/(2.54)^2$ cells per square centimeter and 0.086 millimeter (3.4 mil) wall thickness) to obtain a first coating. Afterwards, the substrate was dried at 120° C. for 15 minutes and at 165° C. for 30 minutes and then calcined at 450° C. for 30 minutes. The washcoat loading of the first coating in the catalyst after calcination was of 79.63 g/l (1.305 g/in$^3$), including 75.67 g/l (1.24 g/in$^3$) of Cu-CHA and 3.97 g/l (0.065 g/in$^3$) of zirconia.
Second Coating (Top Coating)
A mixture with a solid content of 44 weight-% was prepared with a Fe-BEA zeolite (1.5 weight-% of Fe, calculated as $Fe_2O_3$, and a $SiO_2$:$Al_2O_3$ molar ratio of 40), corresponding to a final Fe-BEA loading in the catalyst after calcination of 1.52 g/in$^3$, distilled water and an organic dispersant with a pH of 7. The solid content was fixed at 44 weight-%. The slurry was then milled until the resulting Dv90 determined as described in Reference Example 1 herewith was 5 micrometers. After which, a Fe-MFI zeolite (3.5 weight-% of Fe, calculated as $Fe_2O_3$, and a $SiO_2:Al_2O_3$ molar ratio of 27.5), corresponding to a final Fe-MFI zeolite loading in the catalyst after calcination of 1.52 g/in$^3$, was added along with a colloidal silica binder (a solid content of 40 weight-%, a pH of 9.25, a BET specific surface area of 142 m$^2$/g) was added to the slurry such that the final silica loading in the catalyst after calcination was 9.15 g/l (0.15 g/in$^3$). To this, alpha-alumina was also added, such that a final alumina loading in the catalyst after calcination was 0.004 g/in$^3$. The resulting slurry was then milled until the resulting Dv90 determined as described in Reference Example 1 herewith was 6 micrometers.

The resulting slurry was then disposed over the full length of the first coating to obtain a second coating using the coating method described in Reference Example 4. Afterwards, the substrate was dried at 120° C. for 15 minutes and 165° C. for 30 minutes and then calcined at 450° C. for 30 minutes. The washcoat loading of the second coating in the catalyst after calcination was of 195.28 g/l (3.2 g/in$^3$), including 92.76 g/l (1.52 g/in$^3$) of Fe-BEA, 92.76 g/l (1.52 g/in$^3$) of Fe-MFI, 0.244 g/l (0.004 g/in$^3$) of alpha-alumina and 9.15 g/l (0.15 g/in$^3$) of silica.

Comparative Example 2 Preparing a SCR Catalyst Not According to the Present Invention a) Preparing a Fresh SCR Catalyst Not According to the Present Invention Zirconyl-acetate mixture with a solid content of 30% by weight, such that the final zirconia loading (calculated as $ZrO_2$) in the catalyst after calcination was 0.225 g/in$^3$, was mixed with a Cu-CHA zeolite (3.25 weight-% of Cu calculated as CuO and a $SiO_2:Al_2O_3$ molar ratio of 32) prepared essentially as in Reference Example 2, corresponding to a final Cu-CHA loading in the catalyst of 4.275 g/in$^3$, and deionized water. The resulting slurry was then milled until the resulting Dv90 determined as described in Reference Example 1 herewith was 10 micrometers.

The slurry was then disposed over the full length of an uncoated honeycomb cordierite monolith substrate using the coating method described in Reference Example 4 (diameter 26.67 cm (10.5 inches)×length: 15.24 cm (6 inches) cylindrically shaped substrate with 600/(2.54)$^2$ cells per square centimeter and 0.086 millimeter (3.4 mil) wall thickness) to obtain a coating. Afterwards, the substrate was dried at 120° C. for 15 minutes and 165° C. for 30 minutes and then calcined at 450° C. for 30 minutes. The washcoat loading in the catalyst after calcination was of 274.60 g/l (4.5 g/in$^3$), including 260.88 g/l (4.275 g/in$^3$) of Cu-CHA and 13.73 g/l (0.225 g/in$^3$) of zirconia.

b) Ageing the Catalyst Obtained in a)

The catalyst obtained in a) was aged in air at 650° C. for 50 hours.

Example 2 Use of the SCR Catalysts of Example 1 and Comparative Examples 1 and 2—NOx Conversion/$N_2O$ Formation For the testing, a system comprising a DOC obtained as described in Reference Example 3 positioned upstream of two SCR catalysts according to Example 1 positioned parallel was prepared as well as a system comprising a DOC obtained as described in Reference Example 3 positioned upstream of two SCR catalysts according to Comparative Example 1 positioned parallel and a system using two catalysts according to Comparative Example 2. The systems were evaluated under transient test cycle conditions (WHTC—world harmonized test cycle—hot phase) under real exhaust gas conditions. The emissions were accumulated for 30 minutes and integrated for calculating the converted NOx and the formed $N_2O$ after 30 minutes at the outlet end of the SCR catalysts based on the hot phase cycles. The measurement conditions are displayed in FIG. 1 and the results are displayed in FIG. 2.

As may be taken from FIG. 2, the converted NOx measured for the fresh catalyst of Example 1 is of 5.32 g/kWh and the $N_2O$ make is of 0.053 g/kWh. The converted NOx measured for the fresh catalyst of Comparative Example 1 is of 4.94 g/kWh and the $N_2O$ make is of 0.053 g/kWh. This shows that the SCR catalyst of the present invention achieves improved NOx conversion while maintaining a low $N_2O$ make under fresh conditions compared to a layered SCR catalyst comprising Fe-zeolite in its second coating (top coating). Further, the converted NOx measured for the aged catalyst of Example 1 is of 5.327 g/kWh and the $N_2O$ make is of 0.076 g/kWh. The converted NOx measured for the aged catalyst of Comparative Example 2 is of 5.453 g/kWh and the $N_2O$ make is of 0.115 g/kWh. This shows that the SCR catalyst of the present invention achieves reduced $N_2O$ make (~33.6%) while exhibiting a good NOx conversion compared to a SCR catalyst comprising Cu-CHA.

This example demonstrates that the catalyst of the present invention exhibits great NOx conversion while maintaining low $N_2O$ make under real conditions.

Example 3 Preparing a SCR Catalyst a) Preparing a Fresh SCR Catalyst According to the Present Invention First Coating (Bottom Coating)

Zirconyl-acetate mixture with a solid content of 30% by weight, such that the final zirconia loading (calculated as $ZrO_2$) in the catalyst after calcination was 6.41 g/l (0.105 g/in$^2$) was mixed with a Cu-CHA zeolite (3.25 weight-% of Cu calculated as CuO and a $SiO_2:Al_2O_3$ molar ratio of 32) prepared according to Reference Example 2 herein, and corresponding to a final Cu-CHA loading in the catalyst after calcination of 121.74 g/l (1.995 g/in$^3$), and deionized water. The resulting slurry was then milled until the resulting Dv90 determined as described in Reference Example 1 herewith was 10 micrometers.

The slurry was then disposed over the full length of an uncoated honeycomb cordierite monolith substrate using the coating method described in Reference Example 4 (diameter 26.67 cm (10.5 inches)×length: 15.24 cm (6 inches) cylindrically shaped substrate with 400/(2.54)$^2$ cells per square centimeter and 0.152 millimeter (6 mil) wall thickness) to obtain a first coating. Afterwards, the substrate was dried at 120° C. for 15 minutes and 165° C. for 20 minutes and then calcined at 450° C. for 30 minutes. The washcoat loading of the first coating in the catalyst after calcination was of 128.15 g/l (2.1 g/in$^3$), including 121.74 g/l (1.995 g/in$^3$) of Cu-CHA and 6.41 g/l (0.105 g/in$^3$).

Second Coating (Top Coating)

Titania ($TiO_2$, anatase phase, 90 weight-% and 10 weight-% of tungsten calculated as $WO_3$ with a BET specific surface are of 90 m$^2$/g, a Dv90 of 8.6 micrometers), such that the final titania+tungsten loading in the catalyst after calcination was 1.43 g/in$^3$, was added to distilled water and an organic dispersant with an active content of 39% by weight, and a pH of 8. The amount of organic dispersant was set to 5% of the final loading titania+tungsten oxide in the catalyst after calcination and the solid content of the final slurry was adjusted to 46 weight-%. The pH was set to 6.3 by the addition of an ammonium hydroxide solution. Finally, silica was added to the slurry, such that the final silica loading in the catalyst after calcination was of 0.07 g/in³. The resulting slurry was then mixed until the resulting Dv90 determined as described in Reference Example 1 herewith was 2 micrometers.

The resulting slurry was then disposed over the full length of the first coating to obtain a second coating using the coating method described in Reference Example 4. Afterwards, the substrate was dried at 120° C. for 15 minutes and then at 165° C. for 30 minutes and calcined at 450° C. for 30 minutes. The washcoat loading of the second coating in the catalyst after calcination was of 91.53 g/l (1.5 g/in³), including 87.26 g/l (1.43 g/in³) of titania+tungsten oxide and 4.27 g/l (0.07 g/in³) of silica.

b) Ageing the Catalyst Obtained in a)

The catalyst obtained in a) was further aged in air with 10 vol. % $H_2O$ and 10 vol. % $O_2$ at 550° C. for 100 hours.

Comparative Example 3 Preparing a SCR Catalyst Not According to the Present Invention a) Preparing a Fresh SCR Catalyst Not According to the Present Invention
First Coating (Bottom Coating)
The first coating is prepared as the first coating of Example 3.
Second Coating (Top Coating)

A vanadium oxalate solution (3% vanadium), corresponding to a final vanadia loading in the catalyst after calcination of 0.0375 g/in³, calculated as $V_2O_5$, was mixed with distilled water and titania ($TiO_2$, anatase phase, 90 weight-% and 10 weight-% of $WO_3$ with a BET specific surface are of 90 m²/g, a Dv90 of 8.6 micrometers), corresponding to a final tungsten-titania loading in the catalyst after calcination of 1.392 g/in³, were slowly added and mixed for 5 minutes. Afterwards, an organic dispersant with an active content of 39% by weight and a pH of 8 was added. The amount of organic dispersant was calculated as 5 weight-% of the final titania+tungsten loading in the catalyst after calcination. The solid content of the final slurry was set to 46 weight-%. The pH was adjusted to about 5.0 by the addition of an ammonium hydroxide solution. Finally, silica was added to the slurry, such that a final silica loading in the catalyst after calcination was of 0.07 g/in³. The resulting slurry was then mixed until the resulting Dv90 determined as described in Reference Example 1 herewith was 2 micrometers.

The final slurry was then disposed over the full length of the first coating to obtain a second coating using the coating method described in Reference Example 4. Afterwards, the substrate was dried at 120° C. for 15 minutes and 165° C. for 30 minutes and then calcined at 450° C. for 30 minutes. The washcoat loading of the second coating in the catalyst after calcination was of 92.14 g/l (1.51 g/in³), including 85.43 g/l (1.4 g/in³) of titania+tungsten oxide, 4.27 g/l (0.07 g/in³) of silica and 2.29 g/l (0.0375 g/in³) of vanadium (calculated as $V_2O_5$).

b) Ageing the Catalyst Obtained in a)

The catalyst obtained in a) was further aged in air with 10 vol. % $H_2O$ and 10 vol. % $O_2$ at 550° C. for 100 hours.

Comparative Example 4 Preparing a SCR Catalyst Not According to the Present Invention a) Preparing a Fresh SCR Catalyst Not According to the Present Invention Zirconyl-acetate mixture with a solid content of 30% by weight, such that the final zirconia loading (calculated as $ZrO_2$) in the catalyst after calcination was 6.41 g/l (0.105 g/in³) was mixed with a Cu-CHA zeolite (3.25 weight-% of Cu calculated as CuO and a $SiO_2:Al_2O_3$ molar ratio of 32) prepared according to Reference Example 2 herein, and corresponding to a final Cu-CHA loading in the catalyst after calcination of 121.74 g/l (1.995 g/in³), and deionized water. The resulting slurry was then milled until the resulting Dv90 determined as described in Reference Example 1 herewith was 10 micrometers.

The slurry was then disposed over the full length of an uncoated honeycomb cordierite monolith substrate using the coating method described in Reference Example 4 (diameter 26.67 cm (10.5 inches)×length: 15.24 cm (6 inches) cylindrically shaped substrate with 400/(2.54)² cells per square centimeter and 0.152 millimeter (6 mil) wall thickness) to obtain a coating. Afterwards, the substrate was dried at 120° C. for 15 minutes and 165° C. for 20 minutes and then calcined at 450° C. for 30 minutes. The washcoat loading in the catalyst after calcination was of 128.15 g/l (2.1 g/in³), including 121.74 g/l (1.995 g/in³) of Cu-CHA and 6.41 g/l (0.105 g/in³).

b) Ageing the Catalyst Obtained in a)

The catalyst obtained in a) was aged in air with 10 vol. % $H_2O$ and 10 vol. % $O_2$ at 550° C. for 100 hours.

Example 4 Use of the SCR Catalysts of Example 3 and Comparative Examples 3 and 4—NOx Conversions and $N_2O$ Make For the testing, the SCR catalysts (fresh and aged) of Example 3 and Comparative Examples 3 and 4, respectively, were evaluated under transient test cycle conditions (WHTC—world harmonized test cycle) under real exhaust gas conditions. The cycle was repeated 30 times (WHTC—first cycle cold phase and the subsequent hot phase). The emissions were accumulated for 30 minutes and integrated for calculating the converted NOx and the formed $N_2O$ after 30 minutes at the outlet end of the SCR catalysts. The ratio of the $N_2O$ make to the NOx conversion was further calculated on the basis of the hot phase cycles. The measurement conditions are displayed in FIG. 3 and the results are displayed in Tables 1 to 4 below.

TABLE 1

| | Results (fresh) | | | | | |
|---|---|---|---|---|---|---|
| | Example 3 | | Comp. Example 3 | | Comp. Example 4 | |
| Cycles | NOx conversion (%) | $N_2O$ make (g/kWh) | NOx conversion (%) | $N_2O$ make (g/kWh) | NOx conversion (%) | $N_2O$ make (g/kWh) |
| 2 | 80.2 | 0.018 | 74.8 | 0.033 | 88.7 | 0.054 |
| 5 | 79.7 | 0.024 | 74.8 | 0.034 | 87.9 | 0.053 |
| 6 | 79.5 | 0.024 | 75.1 | 0.034 | 87.2 | 0.052 |
| 11 | 79.2 | 0.024 | 75.2 | 0.035 | 86.0 | 0.048 |
| 12 | 77.5 | 0.023 | 74.9 | 0.036 | 84.4 | 0.048 |
| 17 | 76.9 | 0.023 | 74.7 | 0.036 | 84.8 | 0.046 |
| 18 | 76.7 | 0.023 | 75.4 | 0.036 | 84.6 | 0.046 |
| 23 | — | 0.022 | 75.2 | 0.036 | 83.6 | 0.044 |

TABLE 1-continued

Results (fresh)

| | Example 3 | | Comp. Example 3 | | Comp. Example 4 | |
|---|---|---|---|---|---|---|
| Cycles | NOx conversion (%) | $N_2O$ make (g/kWh) | NOx conversion (%) | $N_2O$ make (g/kWh) | NOx conversion (%) | $N_2O$ make (g/kWh) |
| 29 | — | — | 75.0 | 0.037 | 82.7 | 0.046 |
| 30 | — | — | 74.9 | 0.040 | 82.6 | 0.042 |

TABLE 2

Balance $N_2O$ make/NOx conversion

| Cycles | Example 3 $N_2O$ make/ NOx conversion | Comp. Example 3 $N_2O$ make/ NOx conversion | Comp. Example 4 $N_2O$ make/ NOx conversion |
|---|---|---|---|
| 2 | 0.022 | 0.044 | 0.061 |
| 5 | 0.030 | 0.045 | 0.060 |
| 6 | 0.030 | 0.045 | 0.060 |
| 11 | 0.030 | 0.046 | 0.056 |
| 12 | 0.030 | 0.048 | 0.057 |
| 17 | 0.030 | 0.048 | 0.054 |
| 18 | 0.030 | 0.048 | 0.054 |
| 23 | — | 0.048 | 0.053 |
| 29 | — | 0.049 | 0.056 |
| 30 | — | 0.053 | 0.051 |

As can be seen from Tables 1 and 2, the fresh catalyst of Example 3 permits to obtain a great balance between the NOx conversion and the $N_2O$ make under real exhaust gas conditions. In particular, this is illustrated by the low ratio of nitrous oxide make to NOx conversion of 0.022 to 0.030. Further, the NOx conversion remains stable after the 30 cycles as well as the $N_2O$ make which does not exceed 0.024 g/kWh. In contrast thereto, the fresh catalyst of Comparative Example 4 exhibits a less stable NOx conversion after the cycles and especially exhibits high $N_2O$ from 0.042 to 0.054 g/kWh under fresh conditions, which is two times more than the $N_2O$ make according to the present invention. The ratio of nitrous oxide make to NOx conversion is approximately 3 times greater than the ratio obtained with the inventive catalyst. Furthermore, the fresh catalyst of Comparative Example 3 exhibits a stable NOx conversion but exhibits a lower NOx conversion compared to the catalyst of the present invention and a higher $N_2O$ make, in particular 1.5 to 1.8 times compared to the catalyst of the present invention, under fresh conditions and the ratio of nitrous oxide make to NOx conversion is approximately 2 times greater than the ratio obtained with the inventive catalyst. These tables demonstrate that the fresh catalyst of Example 3 exhibits an improved catalytic performance compared to the comparative catalysts under real exhaust gas conditions.

TABLE 3

Results (aged)

| | Example 3 | | Comp. Example 3 | | Comp. Example 4 | |
|---|---|---|---|---|---|---|
| Cycles | NOx conversion (%) | $N_2O$ make (g/kWh) | NOx conversion (%) | $N_2O$ make (g/kWh) | NOx conversion (%) | $N_2O$ make (g/kWh) |
| 2 | 60.8 | 0.017 | 67.2 | 0.065 | 77.5 | 0.054 |
| 5 | 58.6 | 0.016 | 65.8 | 0.065 | 73.5 | 0.047 |
| 6 | 59.9 | 0.015 | 67.0 | 0.061 | 73.5 | 0.047 |
| 11 | 55.7 | 0.014 | 65.0 | 0.065 | 69.8 | 0.045 |
| 12 | 57.7 | 0.015 | 66.0 | 0.065 | 70.6 | 0.035 |
| 17 | 56.3 | 0.015 | 65.0 | 0.065 | 66.5 | 0.036 |
| 18 | 55.5 | 0.015 | 65.6 | 0.065 | 67.0 | 0.037 |
| 23 | 53.3 | 0.014 | 64.3 | 0.065 | 62.8 | 0.032 |
| 29 | 54.3 | 0.014 | 65.6 | 0.065 | 62.9 | 0.031 |
| 30 | — | — | 63.1 | 0.065 | 60.3 | 0.035 |

TABLE 4

Balance $N_2O$ make/NOx conversion

| Cycles | Example 3 $N_2O$ make (g/kWh)/NOx conversion | Comp. Example 3 $N_2O$ make (g/kWh)/NOx conversion | Comp. Example 4 $N_2O$ make (g/kWh)/NOx conversion |
|---|---|---|---|
| 2 | 0.028 | 0.097 | 0.070 |
| 5 | 0.037 | 0.099 | 0.064 |
| 6 | 0.025 | 0.091 | 0.064 |
| 11 | 0.025 | 0.100 | 0.064 |
| 12 | 0.026 | 0.098 | 0.050 |
| 17 | 0.027 | 0.100 | 0.054 |
| 18 | 0.027 | 0.099 | 0.055 |
| 23 | 0.026 | 0.101 | 0.051 |
| 29 | 0.026 | 0.099 | 0.049 |
| 30 | — | 0.103 | 0.058 |

As can be seen from Tables 3 and 4, the aged catalyst of Example 3 also permits to obtain a great balance between the NOx conversion and the $N_2O$ make under real exhaust gas conditions. In particular, this is illustrated by the low ratio of nitrous oxide make to NOx conversion of 0.028 to 0.037. Further, the NOx conversion remains stable after the 30 cycles as well as the $N_2O$ make which does not exceed 0.017 g/kWh. In contrast thereto, the NOx conversion obtained with the aged catalyst of Comparative Example 4 decreases of approximately 14% after the cycles and the $N_2O$ make is at least two times more elevated than with those obtained with the catalyst of the present invention. The ratio of nitrous oxide make to NOx conversion is thus approximately 2 times greater than the ratio obtained with the inventive catalyst. Furthermore, the aged catalyst of Comparative Example 3 exhibits a stable NOx conversion which is even slightly higher than with the catalyst of the present invention. However, the $N_2O$ make is approximately 4 times higher than the $N_2O$ make measured when using the catalyst of the present invention. And the ratio of nitrous oxide make to NOx conversion is approximately 3.5-3.7 times greater than the ratio obtained with the inventive catalyst. These results demonstrate that the catalyst of Example 3 (fresh and aged) exhibits improved catalytic performance compared to the comparative catalysts under real exhaust gas conditions.

Example 4 demonstrates that the particular composition of the SCR catalyst (fresh and aged) of the present invention permits to obtain great NOx conversion while permitting to reduce the $N_2O$ make under real exhaust gas conditions. This illustrates that the SCR catalyst of the present invention has improved catalytic performance, is stable and also more resistant to sulfation.

CITED LITERATURE

Figure 1:
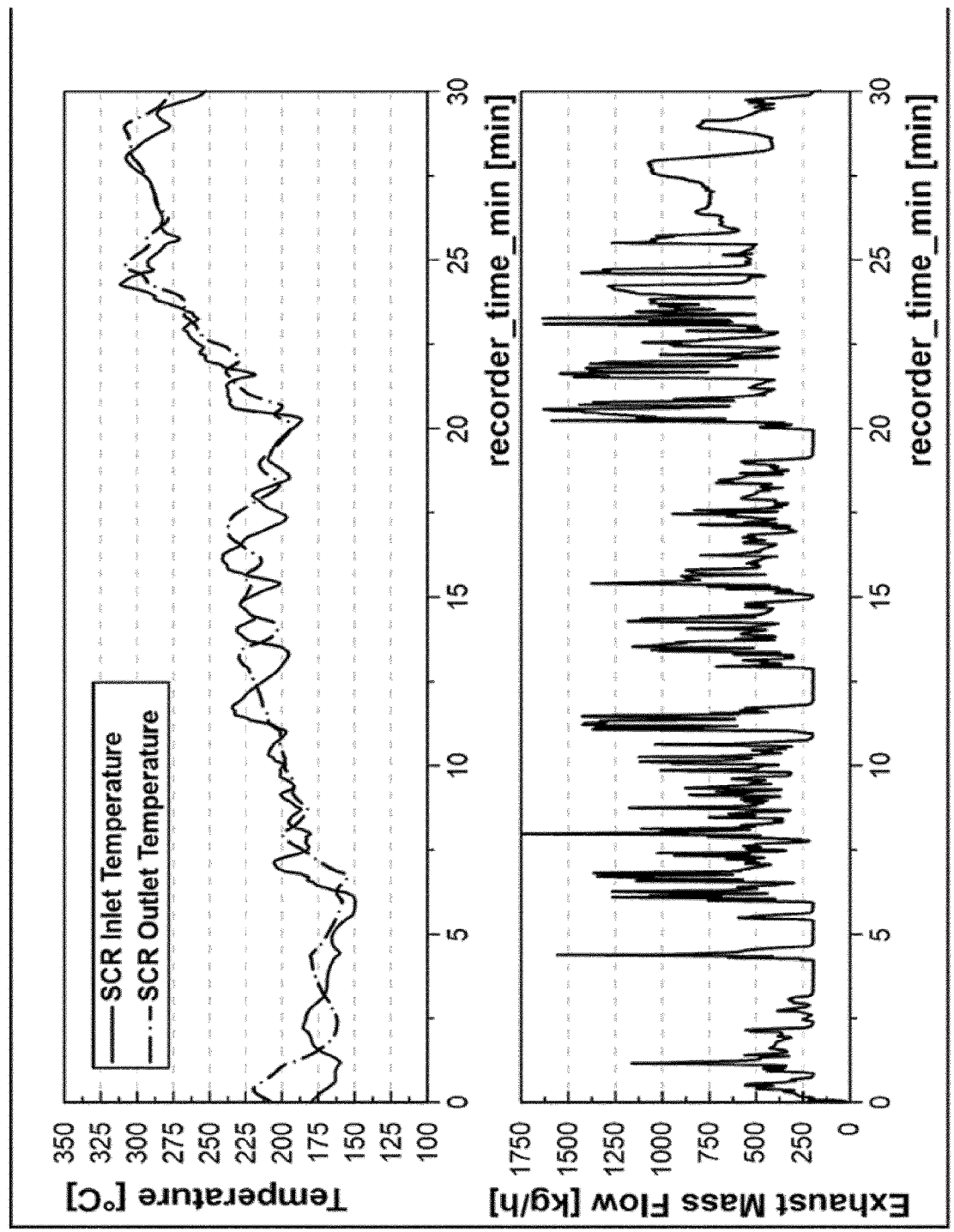
FIG. 1: shows the SCR inlet and outlet temperatures and exhaust mass flows operated for 30 minutes in the WHTC test cycle (world harmonized test cycle—hot phase) at which the converted NOx and the $N_2O$ make for the catalysts of Example 1 and Comparative Examples 1 and 2 have been measured and calculated.
Figure 2:
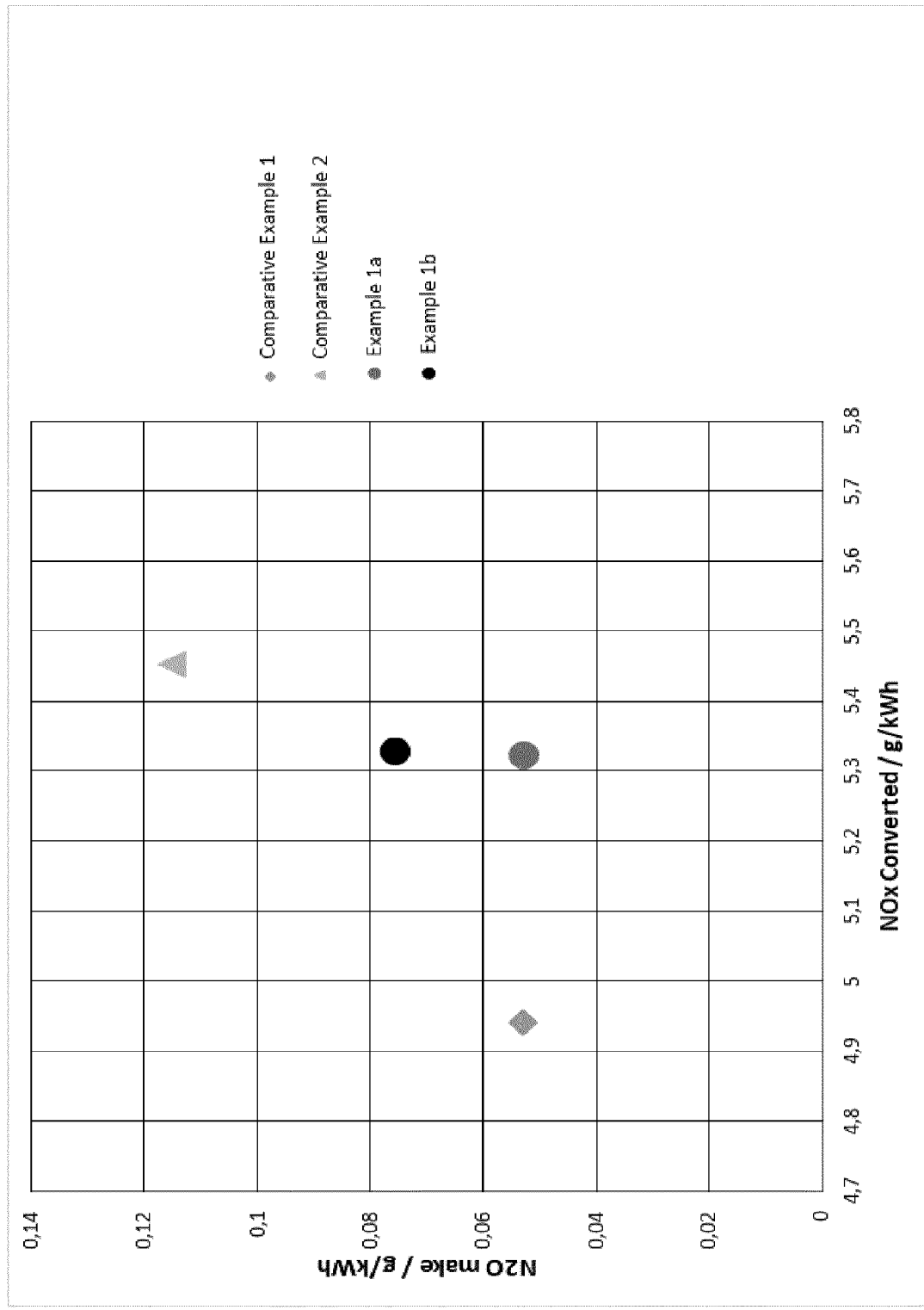
FIG. 2: shows the NOx converted and $N_2O$ formation (in g/kWh) obtained with the catalysts of Example 1 (fresh and aged), Comparative Example 1 (fresh) and Comparative Example 2 (aged), respectively, under transient test cycle conditions (WHTC—world harmonized test cycle—hot phase) under real exhaust gas conditions.
Figure 3:
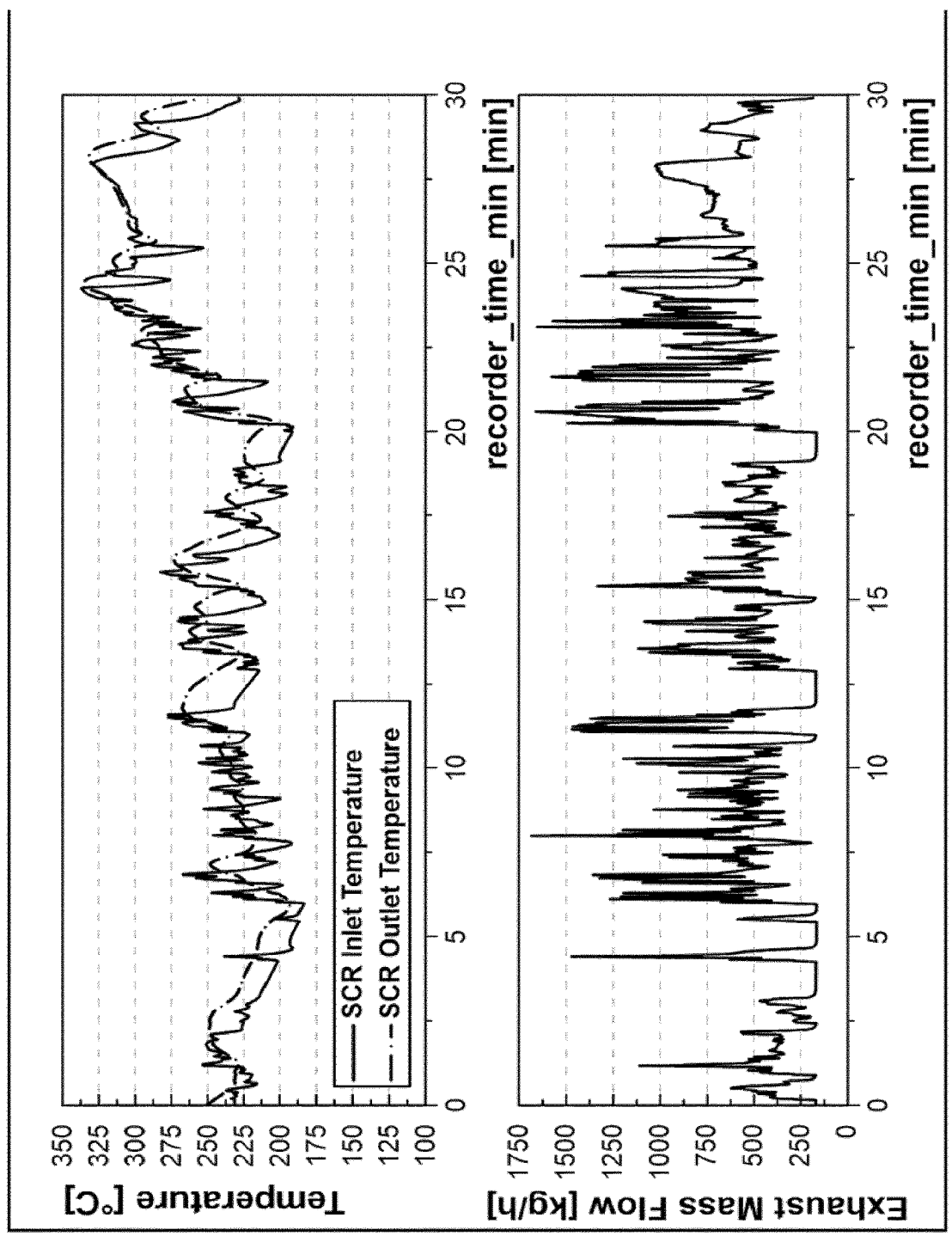
FIG. 3: shows the SCR inlet and outlet temperatures and exhaust mass flows operated for 30 minutes in the WHTC test cycle (world harmonized test cycle—hot phase) at which the converted NOx and the $N_2O$ make for the catalysts of Example 3 and Comparative Examples 3 and 4 have been measured and calculated.

Yisun Cheng et al., Sulfur tolerance and $DeSO_x$ studies on diesel SCR catalysts, SAE International Journal Fuels and Lubricants 1(1), pages 471-476, 2008

Krishna Kamasamudram et al., $N_2O$ formation and mitigation in diesel after-treatment systems, Cummins Inc., SAE International Journal Engines 5(2), pages 688-698, 2012

Ashok Kumar et al., Effect of transition metal ion properties on the catalytic functions and sulfation behavior of zeolite-based SCR catalysts, SAE International Journal Engines 10(4), pages 1604-1612, 2017

U.S. Pat. No. 8,293,199 B2

U.S. Pat. No. 5,047,378 B

CN 105 944 755 A

The invention claimed is:

1. A selective catalytic reduction catalyst suitable for treating an exhaust gas of a diesel engine, the catalyst comprising:
   (i) a flow through substrate comprising an inlet end, an outlet end, a substrate axial length extending from the inlet end to the outlet end and a plurality of passages defined by internal walls of the flow through substrate extending therethrough;
   (ii) a first coating disposed on a surface of the internal walls of the substrate, the surface defining an interface between the internal walls and the passages, the first coating extending over 40 to 100% of the substrate axial length, and comprising an 8-membered ring pore zeolitic material comprising copper and/or iron;
   (iii) a second coating extending over 20 to 100% of the substrate axial length, the second coating comprising a first oxidic material comprising titania, the second coating comprising at least 75 wt. % titania, calculated as $TiO_2$, and from 0 to 0.01 wt. % vanadium oxide(s), calculated as $V_2O_5$,
   wherein in the catalyst, the first coating has a total loading (L1) and the second coating has a total loading (L2), wherein the ratio of the total loading of the first coating relative to the total loading of the second coating, (L1):(L2), is in the range of from 0.5:1 to 5:1.

2. The catalyst of claim 1, wherein the first coating extends over 75 to 100% of the substrate axial length.

3. The catalyst of claim 1, wherein the second coating extends over 75 to 100% of the substrate axial length.

4. The catalyst of claim 1, wherein the second coating disposed on the first coating.

5. The catalyst of claim 1, wherein the 8-membered ring pore zeolitic material in the first coating has a CHA, AEI, RTH, LEV, DDR, KFI, ERI, and/or AFX framework type.

6. The catalyst of claim 1, wherein the zeolitic material in the first coating comprises copper.

7. The catalyst of claim 1, wherein in the framework structure of the zeolitic material in the first coating, the molar ratio of Si to Al, calculated as molar $SiO_2:Al_2O_3$, is in a range of from 2:1 to 50:1.

8. The catalyst of claim 1, wherein the first coating further comprises an oxidic binder.

9. The catalyst of claim 1, wherein from 0 to 0.01 wt. %, of the first coating is titania.

10. The catalyst of claim 1, wherein the titania in the first oxidic material of the second coating has a tetragonal crystal system and/or an orthorhombic crystal system.

11. The catalyst of claim 1, wherein the first oxidic material of the second coating further comprises cerium oxide, magnesium oxide, niobium oxide, silicon oxide, and/or tungsten oxide.

12. The catalyst of claim 1, wherein the second coating further comprises a second oxidic material comprising silica, alumina, zirconia, and/or ceria.

13. The catalyst of claim 1, wherein the first coating extends over 75 to 100% of the substrate axial length, from the inlet end toward the outlet end of the substrate.

14. The catalyst of claim 1, wherein the first coating extends over 75 to 100% of the substrate axial length, from the outlet end toward the inlet end of the substrate.

* * * * *